(12) United States Patent
Yamamoto

(10) Patent No.: US 9,685,985 B2
(45) Date of Patent: Jun. 20, 2017

(54) ANTENNA DEVICE AND CONTAINER BOX FOR ELECTRIC DEVICE

(71) Applicant: NEC Corporation, Tokyo (JP)

(72) Inventor: Katsushi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/021,007

(22) PCT Filed: May 14, 2014

(86) PCT No.: PCT/JP2014/002533
§ 371 (c)(1),
(2) Date: Mar. 10, 2016

(87) PCT Pub. No.: WO2015/037167
PCT Pub. Date: Mar. 19, 2015

(65) Prior Publication Data
US 2016/0218764 A1    Jul. 28, 2016

(30) Foreign Application Priority Data

Sep. 11, 2013  (JP) .................................. 2013-188543

(51) Int. Cl.
*H04B 1/38* (2015.01)
*H04B 1/3888* (2015.01)
(Continued)

(52) U.S. Cl.
CPC ............. *H04B 1/3888* (2013.01); *H01Q 1/02* (2013.01); *H01Q 1/246* (2013.01); *H04B 2001/3894* (2013.01)

(58) Field of Classification Search
None
See application file for complete search history.

(56) References Cited

U.S. PATENT DOCUMENTS 9,203,148 B1 * 12/2015 Teller .................... H01Q 1/244
2008/0186249 A1 * 8/2008 Ottolino ................ H01Q 1/002
                                                    343/872

(Continued)

FOREIGN PATENT DOCUMENTS

JP        4-49403      4/1992
JP        2001-95129   4/2001

(Continued)

OTHER PUBLICATIONS

International Search Report mailed Aug. 19, 2014 in corresponding PCT International Application.

*Primary Examiner* — Lana N Le
(74) *Attorney, Agent, or Firm* — Finnegan, Henderson, Farabow, Garrett & Dunner, L.L.P.

(57) ABSTRACT

Condensation water occurring within a container box (300) is discharged to the outside thereof, thereby keeping the inside of the container box (300) at a low humidity with no condensation water therein. The container box contains an electric circuit (210) therein and is sealed. The container box comprises: a minute discharge aperture (322) formed at a lowermost part of the container box (300); and a discharge valve (330), the discharge valve (330) being a check valve for closing the discharge aperture (322). Only when the an internal pressure of the container box (300) becomes higher than an external pressure thereof by a predetermined value or greater, does the discharge valve (330) opens to discharge the liquid present inside of the container box (300). The discharge valve closes to keep the airtightness of the container box (300) at all other times.

20 Claims, 26 Drawing Sheets

(51) Int. Cl.
*H01Q 1/02* (2006.01)
*H01Q 1/24* (2006.01)

(56) References Cited

U.S. PATENT DOCUMENTS

| | | | | |
|---|---|---|---|---|
| 2008/0226469 A1* | 9/2008 | Yumoto | ................ | F16K 31/265 417/133 |
| 2008/0226470 A1* | 9/2008 | Yumoto | ................ | F16K 31/265 417/133 |
| 2010/0072301 A1* | 3/2010 | Cater | ................... | A61M 11/007 239/333 |
| 2013/0291754 A1* | 11/2013 | Kotefski | ................ | B65D 90/32 102/481 |
| 2016/0149301 A1* | 5/2016 | Behroozi | ................ | H01Q 1/28 342/359 |

FOREIGN PATENT DOCUMENTS

| | | | |
|---|---|---|---|
| JP | 2002-354630 | | 12/2002 |
| JP | 2004-360813 | | 12/2004 |
| JP | 2008-140796 | | 6/2008 |
| JP | 2008140796 A | * | 6/2008 |
| JP | 2010-175057 | | 8/2010 |
| JP | 2010-177616 | | 8/2010 |
| JP | 2010175057 A | * | 8/2010 |
| JP | 2010177616 A | * | 8/2010 |
| JP | 2012-105107 | | 5/2012 |
| JP | 2013-161929 | | 8/2013 |

\* cited by examiner ns # US 9,685,985 B2

ANTENNA DEVICE AND CONTAINER BOX FOR ELECTRIC DEVICE

CROSS-REFERENCE TO RELATED PATENT APPLICATIONS

This application is a National Stage Entry of International Application No. PCT/JP2014/002533, filed May 14, 2014, which claims priority from Japanese Patent Application No. 2013-188543, filed Sep. 11, 2013. The entire contents of the above-referenced applications are expressly incorporated herein by reference.

TECHNICAL FIELD

The present invention relates to an antenna device and a container box for an electric device.

BACKGROUND ART

An antenna device for relaying wireless communication is known (for example, see patent literature 1). The antenna device comprises an antenna unit, an transmitting receiving unit, and fixing means.

As an antenna unit, a parabola antenna is a representative example, but the antenna unit may be a flat antenna, etc.

The transmitting receiving unit is provided behind the antenna unit. The transmitting receiving unit incorporates a receiving circuit and a transmitting circuit, and is an electric circuit unit that modulates and demodulates signals as necessity requires. The transmitting receiving unit has a container box that becomes a housing, and an electric circuit contained in the container box. The transmitting receiving unit is connected to the back surface of the antenna unit. The transmitting receiving unit is also called an outdoor unit (ODU).

The fixing means is a means for installing the antenna device in a high place; for example, the fixing means may be a mounting bracket for mounting the antenna device to a pole.

The antenna device is for relaying wireless communication, therefore the antenna device must be provided at a location with a good unobstructed view of the surrounding areas. Thus, as a matter of course, the antenna device is often provided at a location outside, and in a high place. Therefore, the antenna device is necessarily exposed directly to the direct rays of the sun, wind and rain, and wind and snow.

Here, the transmitting receiving unit contains an electric circuit inside. The electric circuit contains extremely elaborate electronic parts, therefore if the electric circuit is affected by an external environment, a malfunction occurs in the antenna device. Therefore, the container box that becomes the housing of the transmitting receiving unit must be extremely rigid and extremely airtight.

The container box is made of iron or iron alloy to keep the container box sturdy. The container box comprises at least two parts that are fitted together, to contain the electric circuit inside. Much effort is devoted to how to enhance the airtightness of these fitting parts of the at least two parts. For example, the one of these fitting parts is formed to be convex and the other of these fitting parts is formed to be concave, and the one of these fitting parts and the other thereof are fitted together and sealed. Further, an airtight packing is set between the one of these fitting parts and the other thereof. In this way, a rigid and highly airtight container box is formed within the electric circuit contained.

CITATION LIST

Patent Literature

Patent literature 1: Japanese Unexamined Patent Application Publication No. 2012-105107
Patent literature 2: Japanese Unexamined Utility Model Application Publication No. 4-049403

SUMMARY OF INVENTION

Technical Problem

Although it may be thought that it is usual to make the container box highly airtight to protect the electric circuit from the external environment, the present inventors noticed that this may lead to a problem. There is, except for the electric circuit, space in the container box, therefore there is air in the space. It is difficult to make the all products completely airtight even if the container box is formed to be as highly airtight as possible, further it is unavoidable that flowing-in and -out of a minuscule amount of air will occur because the container box is exposed to strong wind and rain. However, it may be thought that the electric circuit would not be negatively affected by the flowing-in and -out of a minuscule amount of air.

The air contains water vapor. As the temperature of the external air fluctuates in a one-day cycle and a seasonal cycle, the container box made of metal gets cold if the temperature of the external air becomes low. Then dew condensation occurs inside of the container box. It is difficult for condensed dew that has once occurred to exit outside from the highly airtight container box, and thus the condensed water stays in the container box. Therefore, the condensed water accumulates little by little in the container box.

Even if the condensed dew is an extremely small amount, this might cause a fatal error in the electric circuit to occur. Since, the amount of communication information is increasing so it is extremely high, the electric circuit comprises micro units arranged in an extremely high density. Therefore, the intervals between wirings become several microns level, and the intervals between printed substrates become 1 mm or less. Even if the condensed dew is very small, the condensed dew adheres across a plurality of wires and printed substrates, and this becomes a cause of the failure of the electric circuit.

Further, even if the condensed water does not adhere directly to the electronic parts, the condensed water that is present in the container box makes the humidity inside of the container box high. This causes faster degradation of the electronic parts and becomes a cause of the failure of the electric circuit.

Patent literature 2 (Japanese Unexamined Patent Application Publication No. 4-049403) discloses a headlight comprising a mechanism for preventing the fogging of lenses. This headlight has a check valve that only allows suction of air, and a check valve that only allows discharge of air, and is further equipped with a desiccant in an inflow passage for the suctioned air. The desiccant absorbs moisture from the suctioned air, and this enables the inside of the headlight to be kept dry. However, even if the desiccant absorbs moisture from the suctioned air by the suctioned air being passed through the desiccant, as some of the moisture might remain in the suctioned air, therefore it is unavoidable that dew condensation inside of the headlight will occur in any case. Once condensed water has occurred inside of the headlight, it stays inside.

The Problems to be solved by the invention are explained with reference to the transmitting receiving unit (outdoor unit) as an example. The above-mentioned problems are ones that very commonly occur with an electric device that is placed outside.

It is an object of the present invention to provide an antenna device that can maintain the transmitting receiving unit in a low humidity atmosphere without dew condensation.

Further, it is an object of the present invention to provide a container box for an electric device that can maintain the electric device in a low humidity atmosphere without dew condensation.

Solution to Problem

An antenna device according to the present invention is an antenna device comprising:
an antenna unit that transmits and receives a radio wave; and
a transmitting receiving unit that performs at least receiving processing and transmitting processing of the radio wave, wherein
the transmitting receiving unit comprises:
an electric circuit; and
a container box that contains the electric circuit therein and is sealed to protect the electric circuit from an external environment,
the container box comprising:
a minute discharge aperture formed at a lowermost part of the container box; and
a discharge valve, the discharge valve being a check valve for closing the discharge aperture,
the discharge valve opening to discharge liquid present inside of the container box via the discharge aperture only when an internal pressure of the container box becomes higher than an external pressure thereof by a predetermined value or greater, and
the discharge valve closing to keep airtightness of the container box at all other times.

Advantageous Effects of Invention

According to the present invention, it is possible to discharge the condensation water occurring within a container box, to keep the atmosphere of the inside of the container box at a low humidity with no condensation water therein.

DESCRIPTION OF EMBODIMENTS

Figure 1:
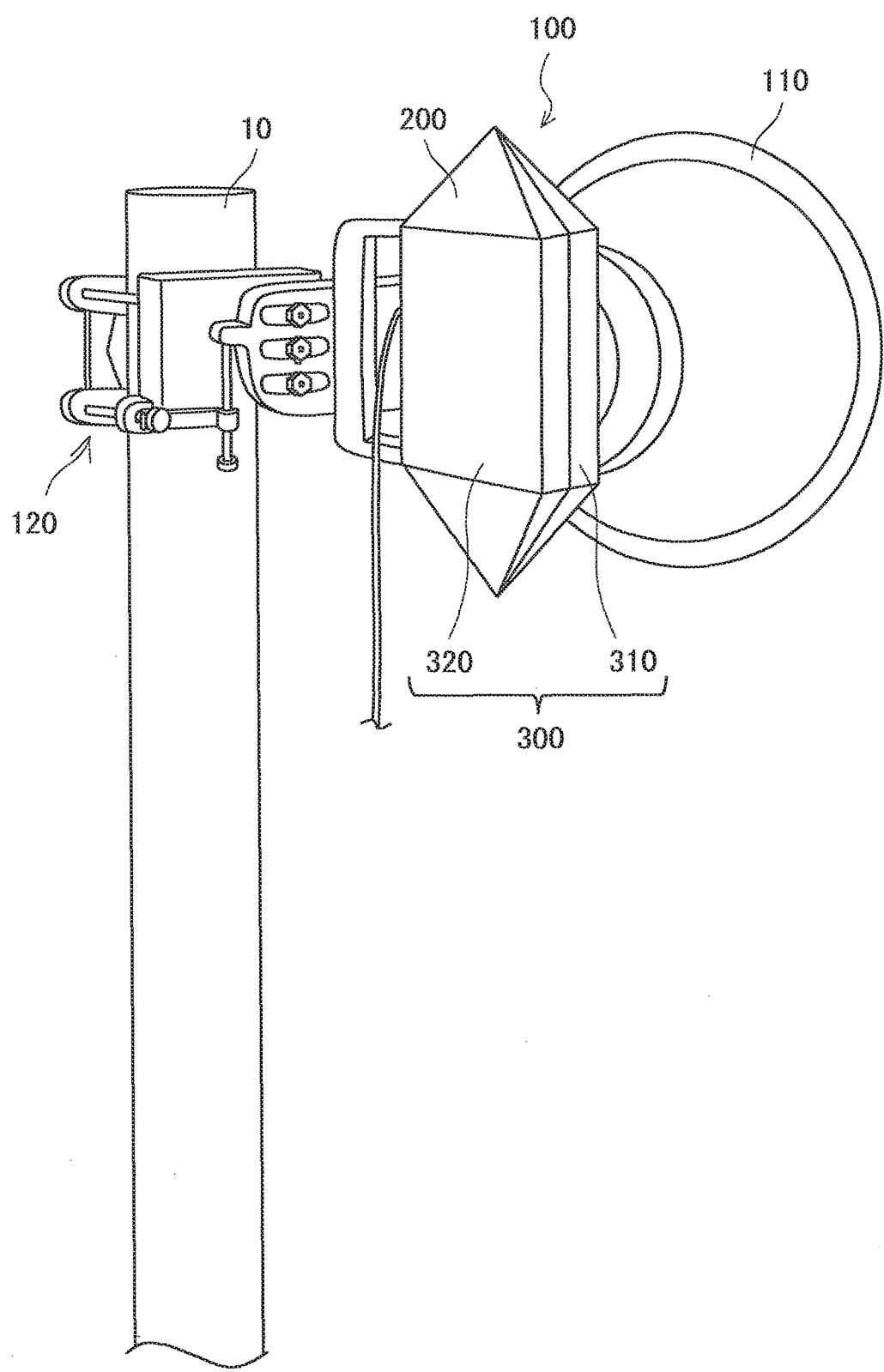
FIG. 1 is a diagram showing a state in which an antenna device is attached to a pole.

Exemplary embodiments of the present invention will be illustrated and described with reference to the reference signs by which elements in the drawings are followed.

First Exemplary Embodiment

The first exemplary embodiment of the present invention will be described. FIG. 1 shows an attitude of an antenna device 100 as viewed from the back side thereof in a state in which the antenna device 100 is attached to a pole 10.

The antenna device 100 comprises an antenna unit 110, a transmitting receiving unit 200, and a mounting means 120.

Here, the antenna unit 110 is a parabola antenna.

The transmitting receiving unit 200 incorporates a receiving circuit and a transmitting circuit, and is an electric circuit unit that modulates and demodulates signals as necessity requires. The configuration of the transmitting receiving unit 200 is an important part of this exemplary embodiment as described later.

The mounting means 120 is a means for mounting and fixing the antenna device 100 to the pole 10. The configuration of the mounting means 120 is already known, and thus a detailed explanation thereof is omitted.

Figure 2:
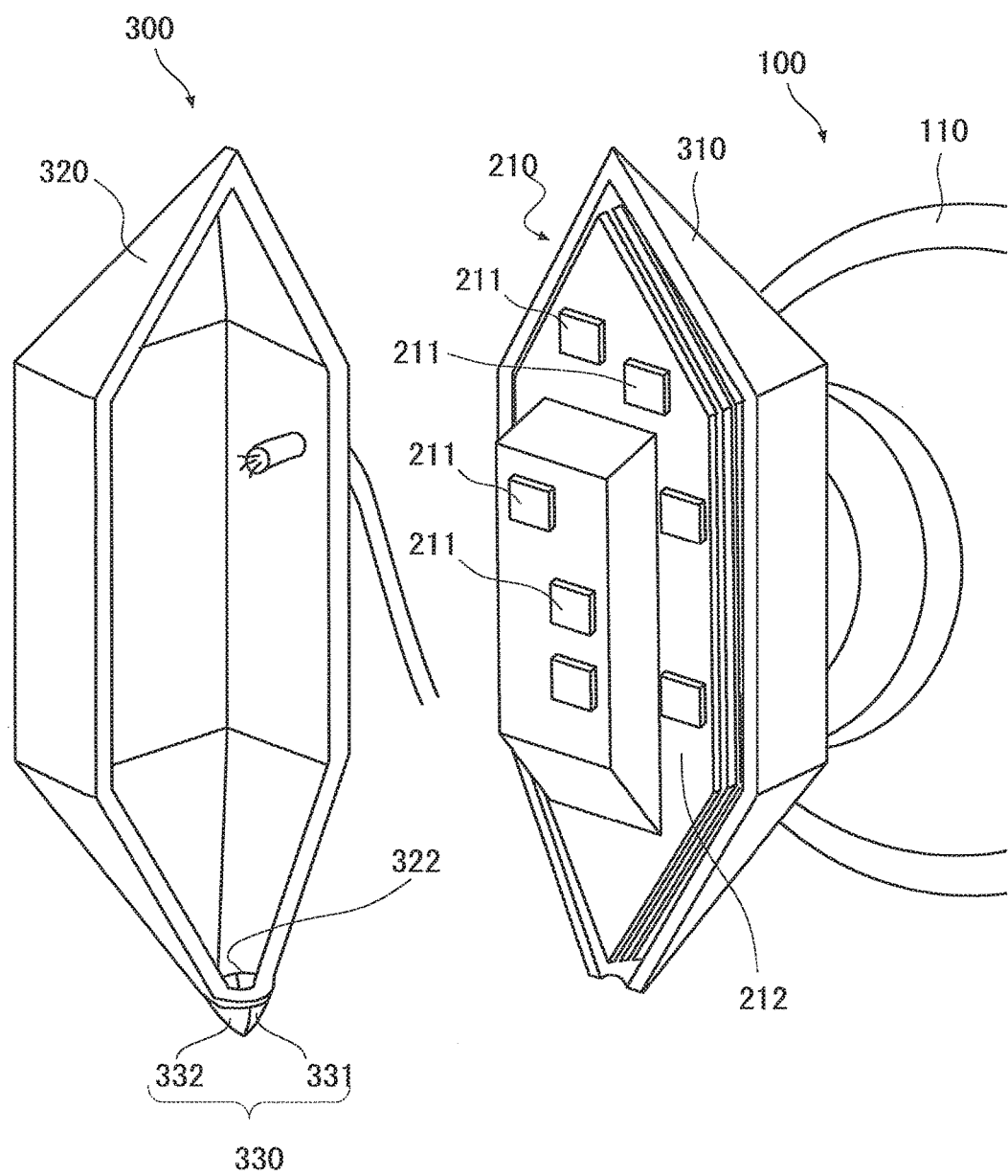
FIG. 2 is a diagram showing inside of a transmitting receiving unit of the antenna device as seen from the back side thereof.

FIG. 2 is a diagram showing the inside of a transmitting receiving unit 200 of the antenna device 100 seen from the back side thereof.

The transmitting receiving unit 200 is connected to the back surface of the antenna device 100. The transmitting receiving unit 200 comprises an electric circuit 210 and a container box 300 that becomes a housing containing the electric circuit 210 therein.

The electric circuit 210 comprises a plurality of substrates 212 on which chips 211 are mounted.

Figure 5:
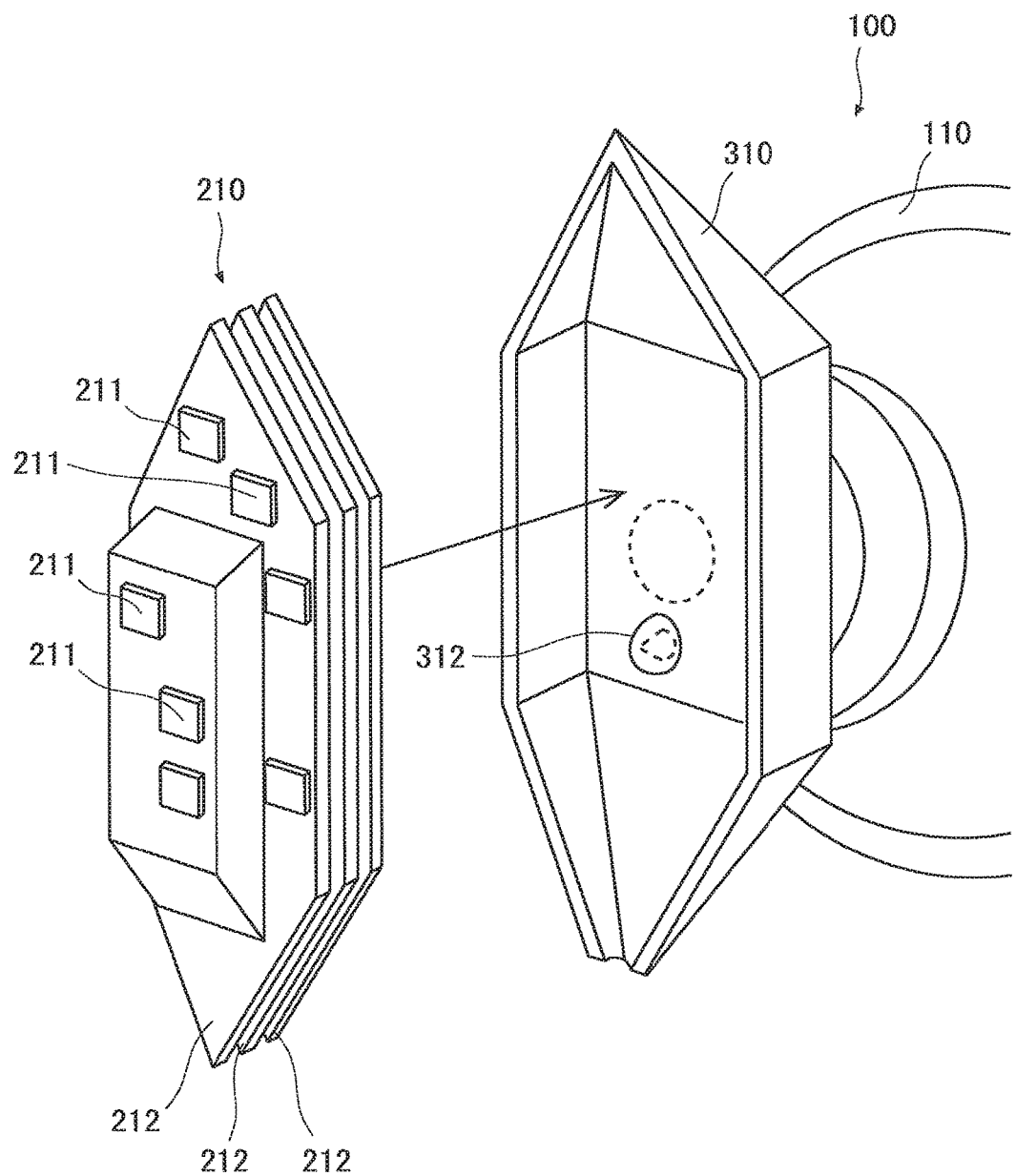
FIG. 5 is a diagram showing the inside surface of a front side part of the container box from which an electric circuit has been removed.

The plurality of substrates 212 are laminated with minute intervals between them (refer to FIG. 5). Here, the substrates 212 are hexagons in accordance with the shape of the container box 300. This shape of the substrates 212 is designed for eliminating a dead space as far as possible.

As shown in FIG. 1 and FIG. 2, the container box 300 is designed to be a bipyramidal form in which the top part and the bottom part of the container box 300 respectively are pointed. Here, the container box 300 has a shape in which the middle part of the container box 300 is a quadrangular prism (a rectangular parallelepiped), and a quadrangular pyramid is connected to each of the upper and lower sides of the quadrangular prism.

The container box 300 comprises two parts that are fitted together. (The container box 300 may be configured with two or more parts, of course.)

Here, in the antenna device 100, the side of the antenna device 100 that the antenna unit 110 is connected thereto is regarded as the front of the container box, and the opposite side of the antenna device 100 is regarded as the back thereof. Then, the container box 300 is configured with a combination of a front side part 310 that configures the front side of the container box 300 and a back side part 320 that configures the back side thereof.

When the front side part 310 and the back side part 320 are fitted together, a container space is formed inside thereof.

FIG. 2 is a diagram as viewed from the back side of the container box 300 of a state in which the back side part 320 is removed. It should be noted that it is preferable that the junction surfaces of the front side part 310 and the back side part 320 be concave-convex surfaces that fit together to obtain high airtightness, but the illustration of such surfaces is omitted for convenience of illustration in the present exemplary embodiment.

In both of the front side part 310 and the back side part 320, the shape inside thereof is a bipyramidal form in which the top part and the bottom part are respectively tapered to form a point. Hereby, if a dew condensation occurs at an inner wall of the container box 300, the condensed dew flows along the inside surface of the inner wall and reaches a lowermost part of the container box 300.

(In the present exemplary embodiment, the exterior shape of the container box 300 becomes a bipyramidal form as a result of configuring the shape inside of the container box 300 to be a bipyramidal form. However the exterior shape of the container box 300 is not an important element of the present exemplary embodiment. Therefore, the exterior shape itself of the container box 300 may be instead formed so that the container box 300 has a rectangular parallelepiped exterior shape.)

Further, in both the front side part 310 and the back side part 320, the inside surfaces thereof (hereafter simply "inside surfaces") have a property by which the condensed dew adheres easily thereto. Specifically, the inside surfaces of the front side part 310 and the back side part 320 have a property by which the condensed dew adheres more easily on them than it does on the electric circuit 210. For example, if a thing corresponding to a droplet kernel that corrects water vapor and then creates a droplet adheres to the inside surfaces, dew condensation easily occurs on the inside surfaces than it does on the electric circuit 210. For example, these inside surfaces may be given a minute concave-convex shape. A sandblast may be used for giving an irregularity to these inside surfaces to give them the minute concave-convex shape. For giving the inside surfaces a property by which dew condensation is more likely to occur thereon, various devices can be provided.

Figure 3:
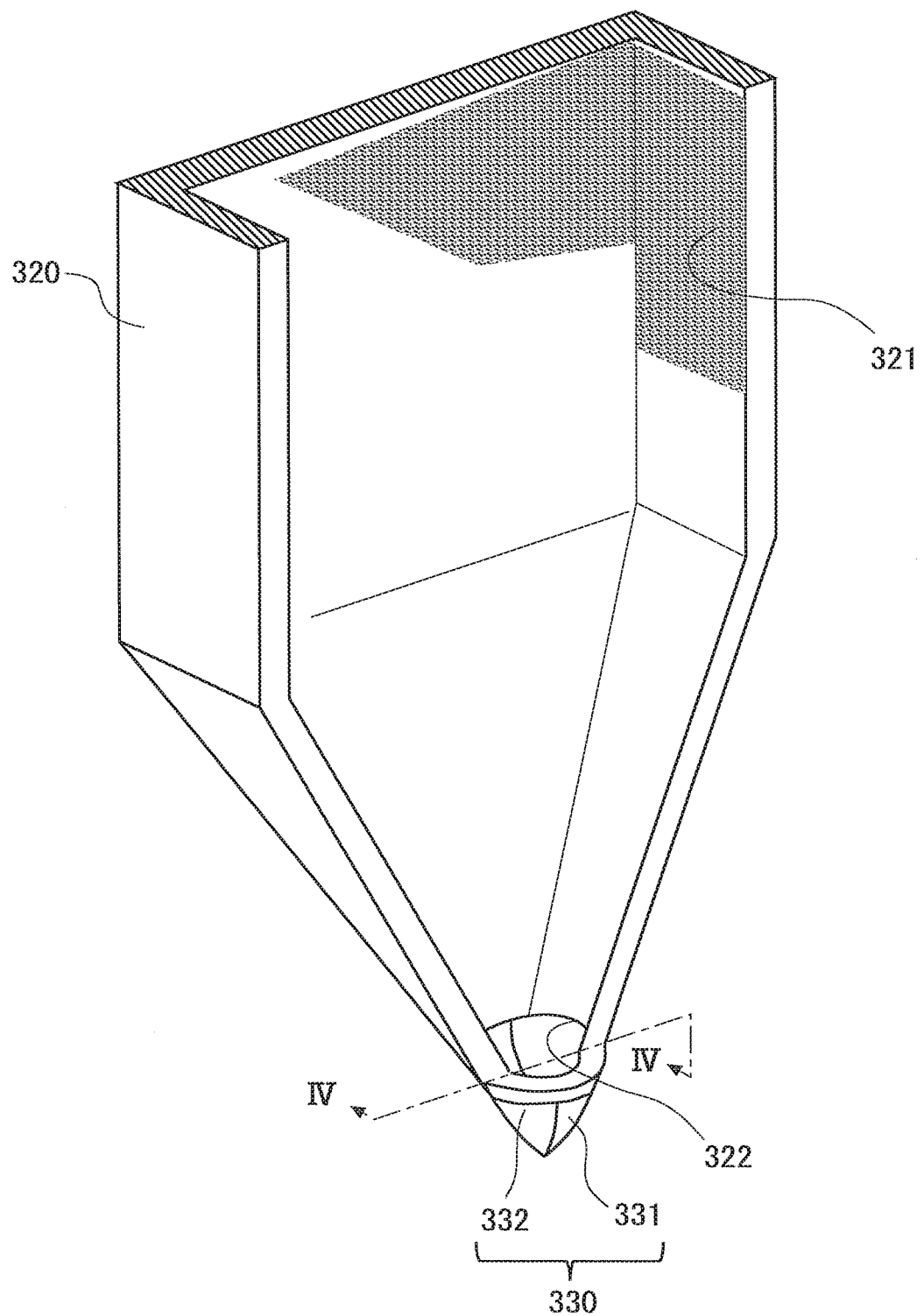
FIG. 3 is a partial enlarged view of a back side part of a container box.

FIG. 3 is a partial enlarged view of the back side part 320. In FIG. 3, a minute concave-convex part 321 is shown by a hatching pattern. A part of the minute concave-convex part 321 is hatched for convenience of illustration.

Further, if dew condensation occurs on the inside surfaces, it is preferable to make the condensed dew move to a lowermost part of the container box as fast as possible so it does not remain for a long time on the inside surfaces. For example, in both of the front side part 310 and the back side part 320, the inside surfaces thereof may have water repellency. If the container box itself is made of a metal, the inside surfaces thereof may be thinly coated with a water repellent paint. Further, a plurality of vertical minute grooves may be formed on the inside surfaces (illustration is omitted).

A discharge valve 330 is formed at a lowermost part of the container box 300. Here, the discharge valve 330 is formed to the back side part 320. In the back side part 320, an aperture 322 is formed at the lowermost part of the back side part 320. The discharge valve 330 is formed in the aperture 322.

Figure 4:
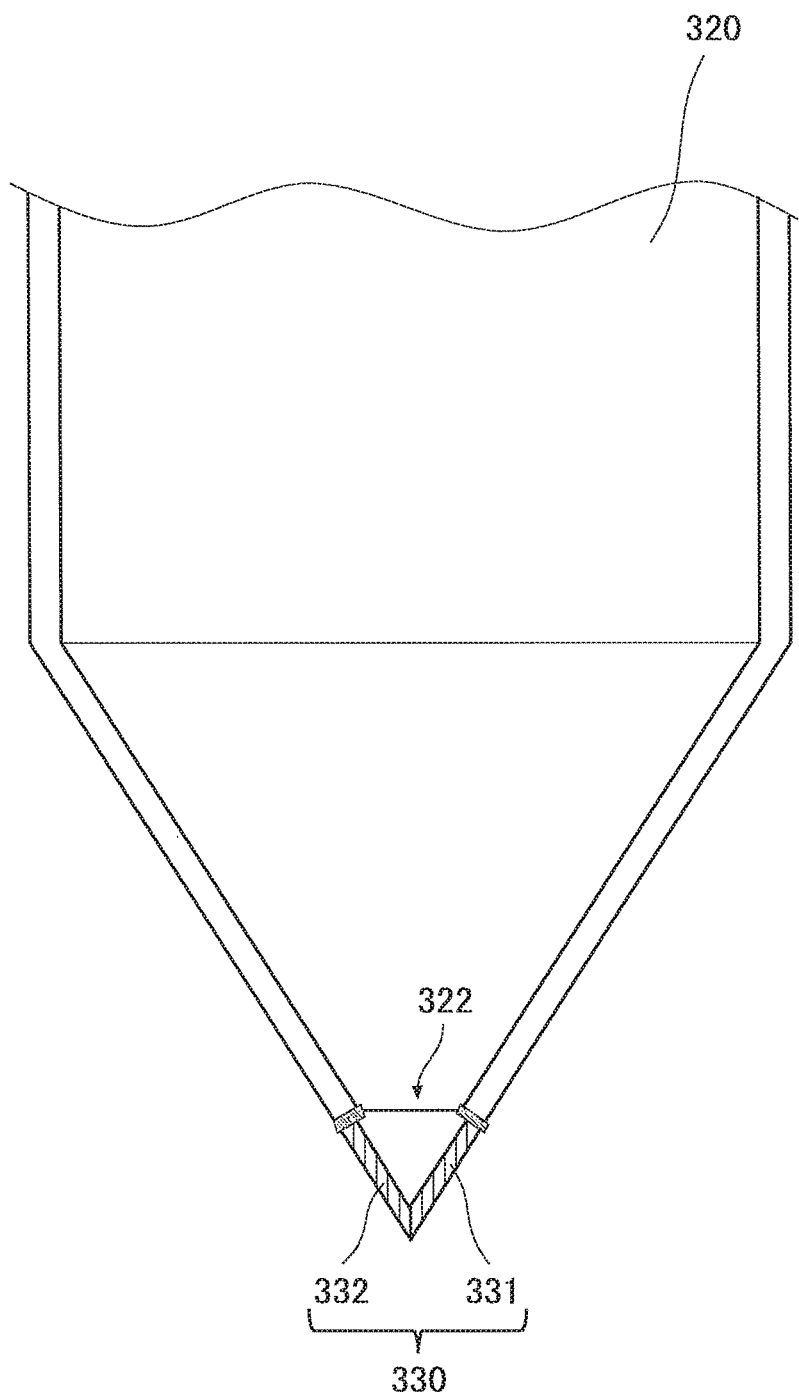
FIG. 4 is a cross section of a back side part as seen from the direction of the IV-IV line indicated by an arrow of FIG. 3.

FIG. 4 is a cross section of the back side parts as seen from the direction of the IV-IV line indicated by an arrow of FIG. 3.

The discharge valve 330 has a mortar like shape. (The discharge valve 330 may instead have a funnel-shaped or a circular conical shaped.)

When the droplet reaches the discharge valve 330, the droplet is able to stay in the discharge valve 330 temporarily. In other words, the internal diameter of the discharge valve 330 becomes smaller toward an end thereof. The discharge valve 330 is formed by two parts 331, 332 in which the two parts 331, 332 are put together like a beak of a bird, so that the tips (the lowermost parts) of the two parts 331, 332 are parted from each other and the discharge valve 330 opens. In other words, each part 331, 332 has a shape formed by cutting the mortar with the plane that contains a cone axis thereof.

The two parts 331, 332 that configure the discharge valve 330 are configured with a material having elasticity to a certain extent.

For example, the material that configures the two parts 331, 332 may be a sheet metal and resin material having elasticity. The bottoms of the two parts 331, 332 are fixed to a periphery of the aperture 322 so that the tips of the two parts 311, 322 apply pressure to each other. In this way, the discharge valve 330 is completely closed in the usual condition. Then a mechanism is made by which the two parts 331, 332 are parted from each other and the discharge valve 330 opens if a pressure is applied on the tips of the two parts 331, 332 from inside thereof (See FIG. 12).

The operation of the discharge valve 330 is described in detail later.

A suction valve 340 is also formed on the container box 300.

FIG. 5 is a diagram showing the inside surface of the front side part 310 in which the electric circuit 210 is removed. As shown in FIG. 5, in the front part 310, the suction valve 340 is arranged at a location slightly below the mounting position of the antenna unit 110.

Figure 6:
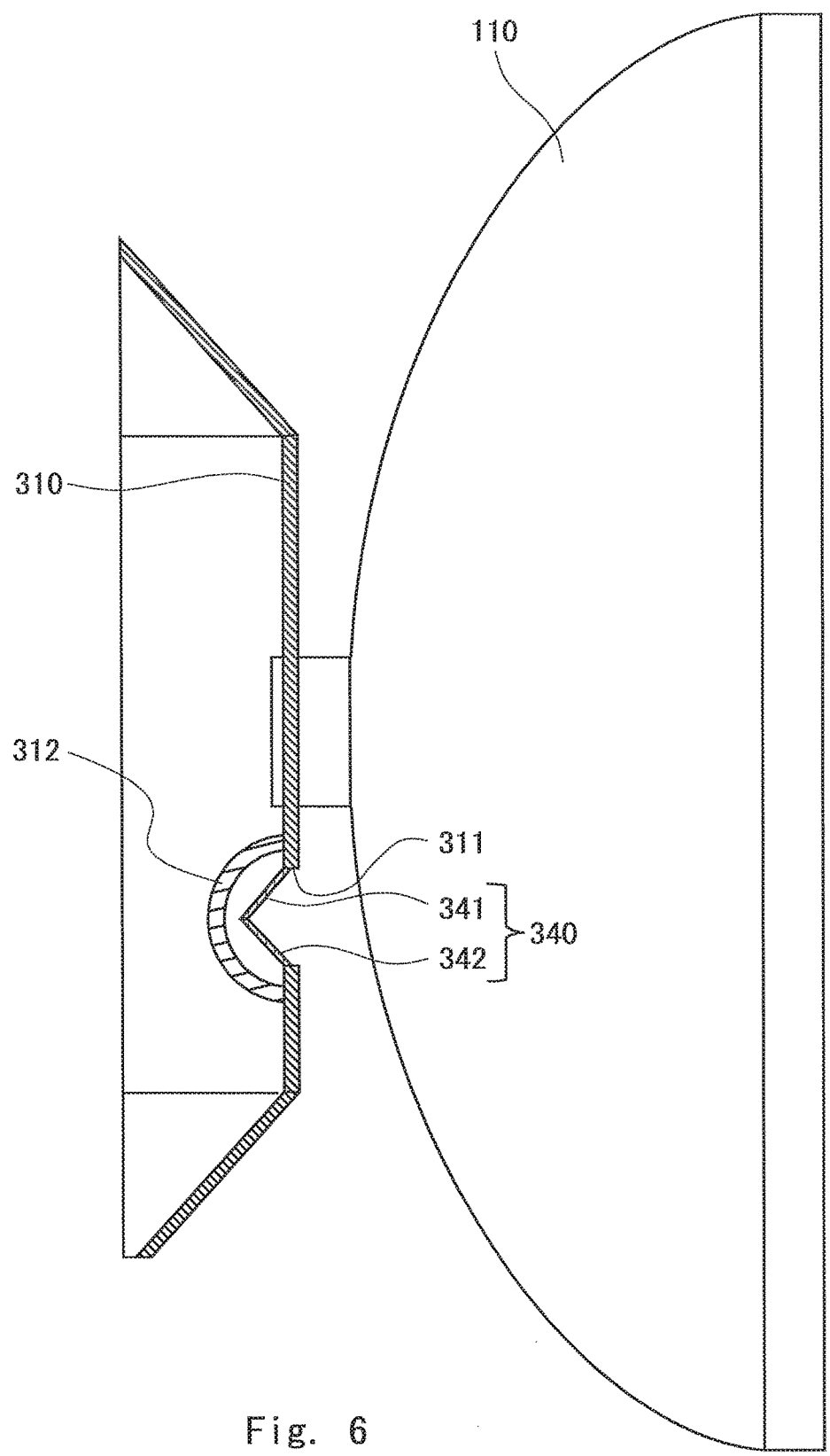
FIG. 6 is a cross section of the front side part of the container box.

FIG. 6 is a cross section of the front side part 310. As shown in the cross section of FIG. 6, an aperture 311 is bored into the front side part 310, and the suction valve 340 is formed in the aperture 311.

This aperture 311 and the suction valve 340 are located in a position behind the antenna unit 110. By forming the suction valve 340 in such a location, the suction valve 340 is not directly exposed to wind and rain, and wind and snow.

The shape and the structure of the suction valve 340 are the same as the shape and the structure of the discharge valve 330. In other words, the suction valve 340 has a mortar like shape, the suction valve 340 is formed by two parts 341, 342 being put together. However, the suction valve 340 sucks an air from the outside to the inside, therefore a vertex of the circular cone faces toward the inside of the container box 300.

Further, a filter 312 that covers the suction valve 340 is provided to the suction valve 340. The filter 312 is for filtering out at least one of dust, a salt content, and moisture from an air passing through the filter 312.

The explanation of the examples of the operation of the discharge valve

The operation and the function of the discharge valve 330 will be described with reference to FIGS. 7 to 12.

FIGS. 7 to 12 are schematic diagrams for convenience of illustration. It should be understood that FIGS. 7 to 12 are like perspective diagrams of the back side part 320 when viewed from the back side of the transmitting receiving unit 200.

The state shown in FIG. 7 will be described first.

Figure 7:
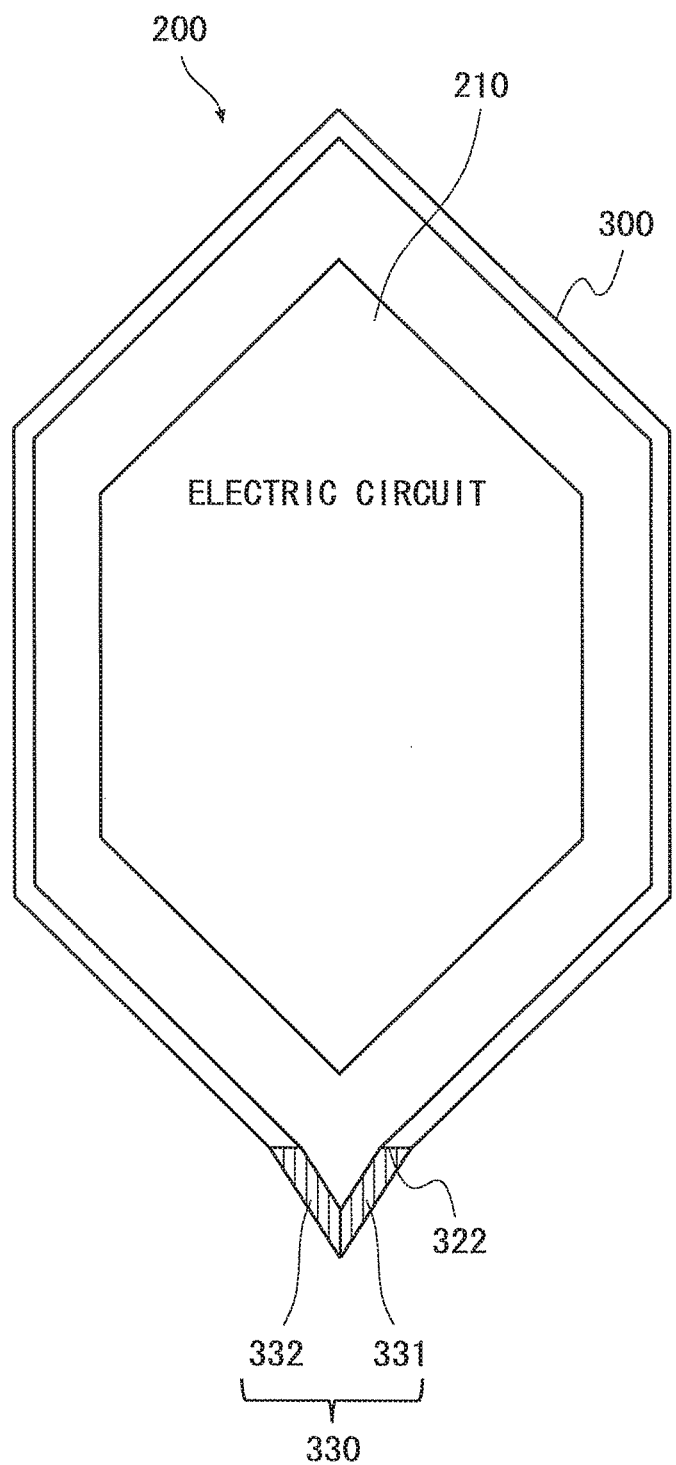
FIG. 7 is a diagram for explaining an operation and a function of a discharge valve.

In FIG. 7, the discharge valve 330 is closed, the suction valve 340 is also closed, although this is not shown, and thus the inside of the container box 300 is kept airtight. It should be noted that there is a space between the electric circuit 210 and the inner wall of the container box 300 and there is air containing moisture (water vapor) to a certain extent.

It is impossible to completely seal the container box 300 even in the case where high airtightness is obtained, and thus there is a possibility that air containing moisture may flow in the container box 300 from a slight crack. (For example, if the temperature becomes low, then the volume of the air contracts and therefore an internal pressure of the container box 300 becomes low. Then there is a possibility that outside air containing moisture may flow into the container box 300 through a slight crack little by little.)

In this above state, an outside temperature becomes low, then an inside temperature of the container box 300 also becomes low. The temperature sometimes fluctuates more than 20° C. in a one-day cycle and a seasonal cycle.

Figure 8:
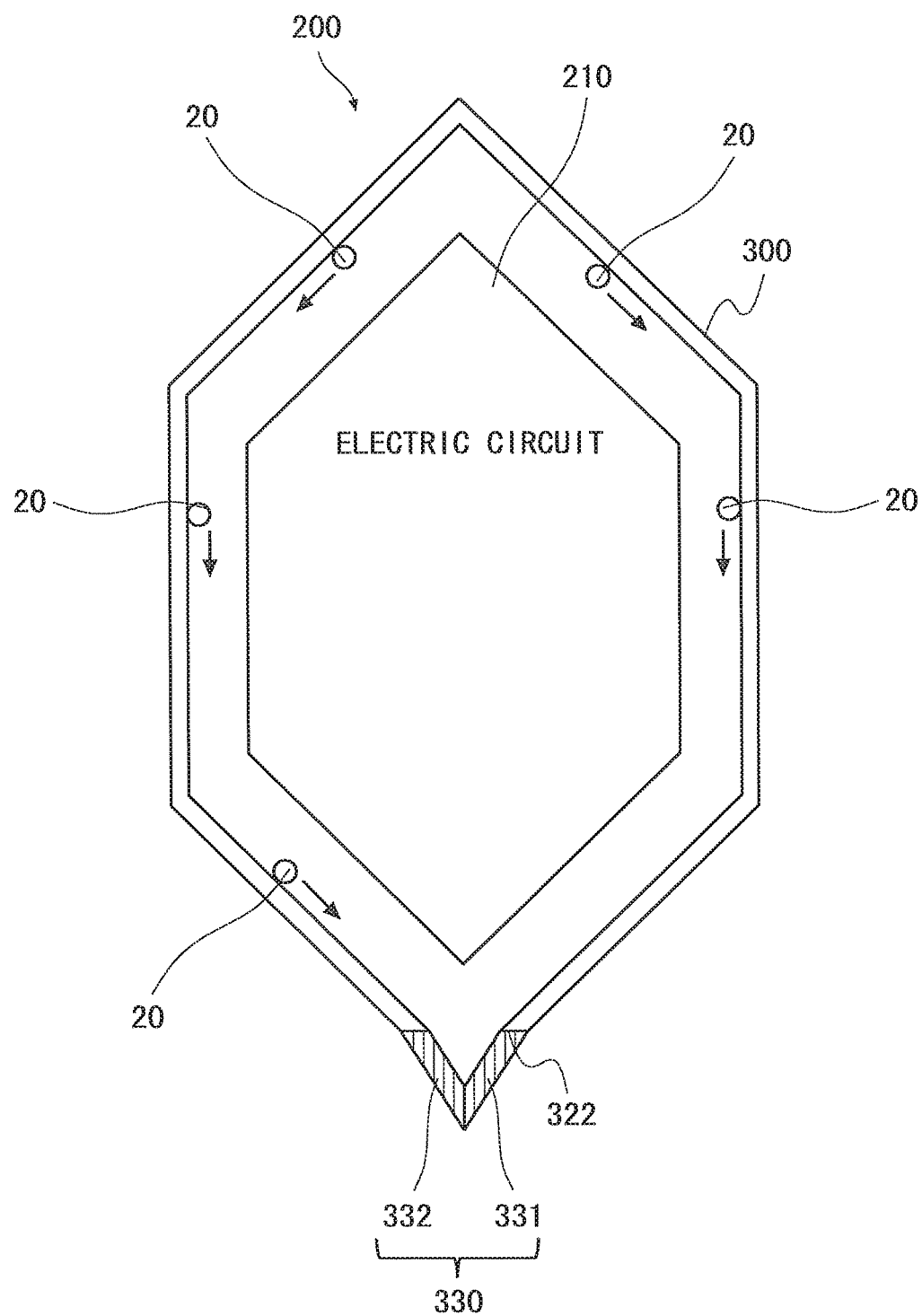
FIG. 8 is a diagram for explaining an operation and a function of the discharge valve.

As shown in FIG. 8, if the temperature becomes low, the moisture (water vapor) condenses and then a droplet 20 appears. In the present exemplary embodiment, the inner wall of the container box 300 is processed to have a property that dew condensation is more likely to occur. Therefore, the condensed dew 20 adheres to the inner wall of the container box 300.

In FIG. 8, this above state is illustrated schematically.

As shown in FIG. 8, there is a possibility that the condensed dews 20 may appear everywhere on the inner wall of the container box 300.

Here, the container box 300 is designed to be a bipyramidal form in which the top part and the bottom part of the container box 300 respectively are tapered so as to form a point, so that the droplets 20 flow down to a lowermost part of the container box 300 thereof along the inner wall thereof.

In FIG. 8, the directions of the flows of the droplets 20 are shown by arrows.

The inner wall of the container box 300 is subjected to treatment such as water-repellent, so the droplets 20 flow speedily without remaining thereon.

As shown in FIG. 8, it should be noted that the top part of the container box 300 is configured to be a conic form to make the droplets 20 flow along the inner wall without falling down on the electric circuit 210.

For example, in conventional container box having a simple rectangular parallelepiped exterior shape in which the top surface is a horizontal plane, there is a possibility that the droplets 20 may fall down on the electric circuit 210.

Figure 9:
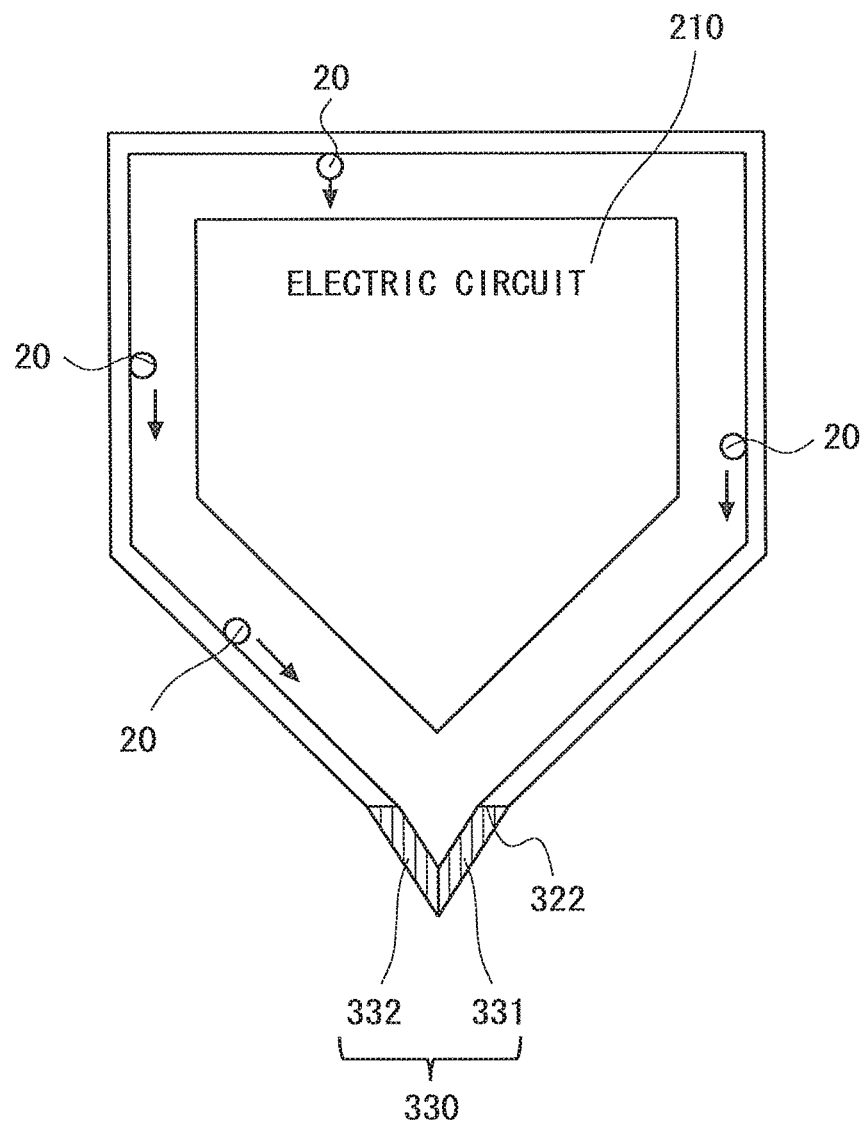
FIG. 9 is a diagram showing one unpreferable example of a shape of a container box.

In FIG. 9, the above state is illustrated as an example.

Figure 10:
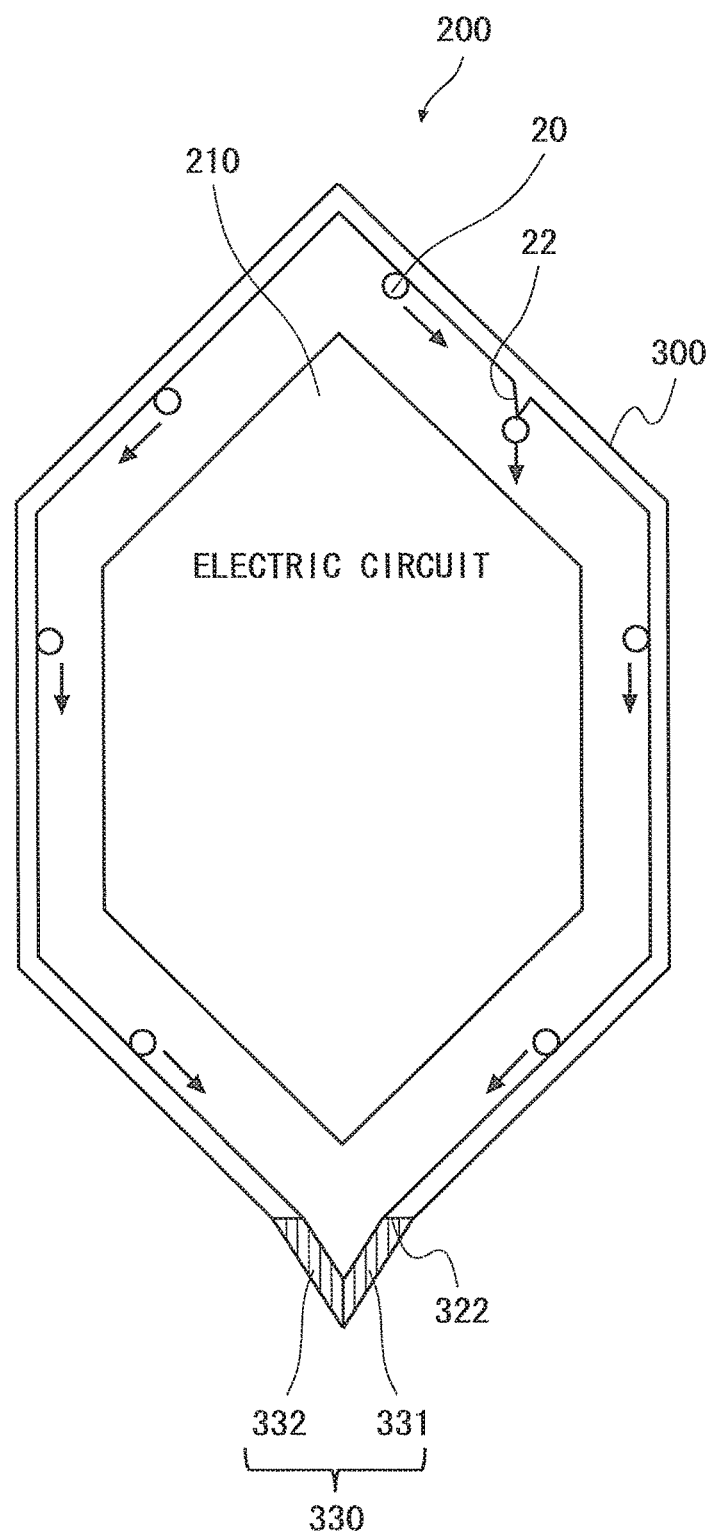
FIG. 10 is a diagram showing one unpreferable example of the shape of the container box.

Further, if there is a projection 22 suspending from the top surface of the container box 300, the droplet 20 may move along the projection 22 and then fall down on the electric circuit 210 (See FIG. 10).

Therefore, it is important to sufficiently incline the inner wall of the container box 300 positioned higher than the electric circuit 210 and to eliminate such projection thereon.

Figure 11:
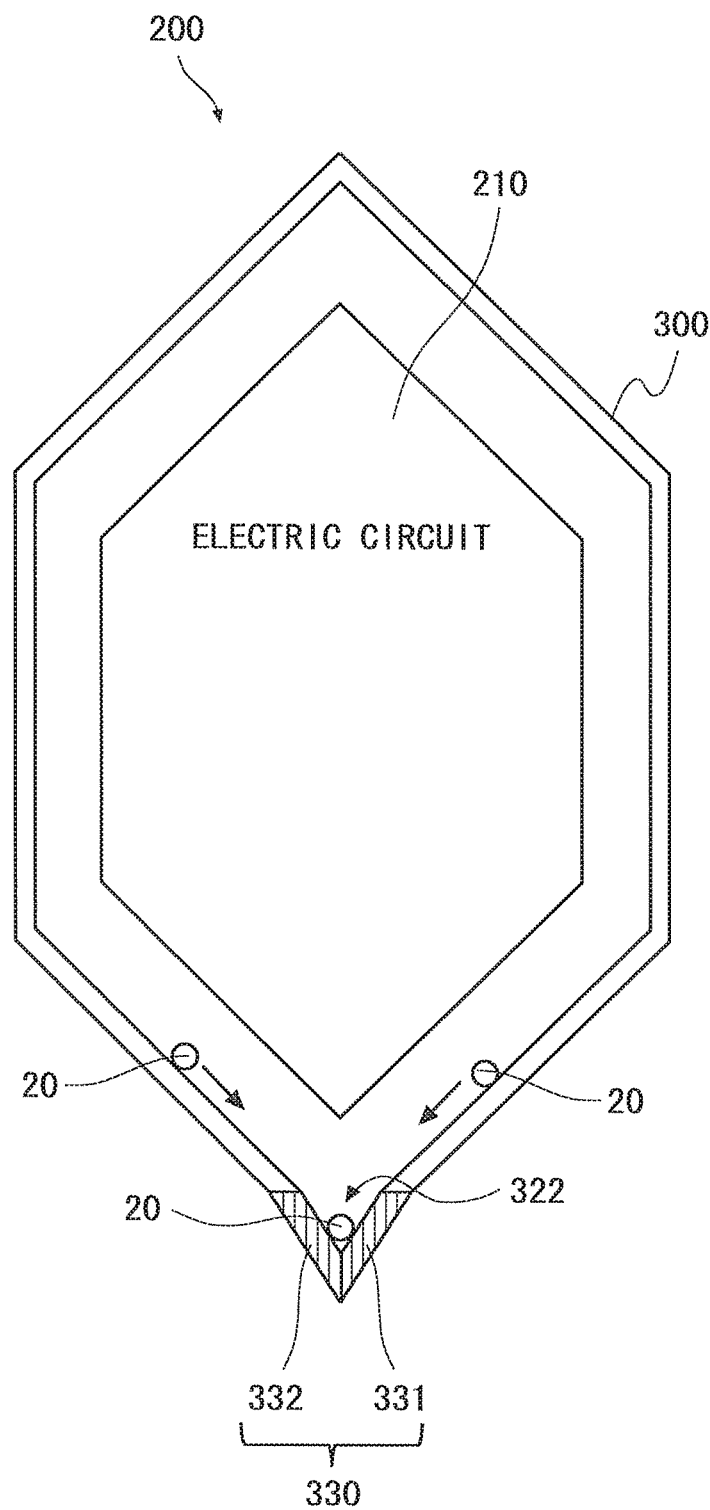
FIG. 11 is a diagram for explaining an operation and a function of a discharge valve.

As shown in FIG. 11, as the droplets 20 flow to the lowermost part of the container box 300, the droplets accumulate on the discharge valve 330 that is closed.

In this way, even though there is a possibility that the condensed dew 20 may appear when the temperature is low, the condensed dew 20 flows downward along the inner wall of the container box 300 and then remain on the discharge valve 330. Therefore, even if the condensed dew 20 appears when the temperature is low, there is no danger that the condensed dew 20 may negatively affect the operation of the electric circuit 210.

When the temperature becomes higher again after being low, the temperature inside of the container box 300 also becomes high.

If the droplets 20 that accumulate on the discharge valve 330 remain as they were, the droplet 20 will evaporate as the temperature rise, and the humidity inside of the container box 300 will increase.

(There is a danger that such humidity increase will cause a degradation of the electronic parts of the electric circuit 210.)

Regarding this point, in the present exemplary embodiment, the discharge valve 330 at the lowermost part of the container box 300 opens when a pressure is applied on the discharge valve 330 from the inside thereof.

If the temperature inside of the container box 300 rises as an atmospheric temperature rises, the volume of the air expands and therefore the internal pressure of the container box 300 becomes higher.

The discharge valve 330 is pushed to open by the internal pressure when the internal pressure rises.

Figure 12:
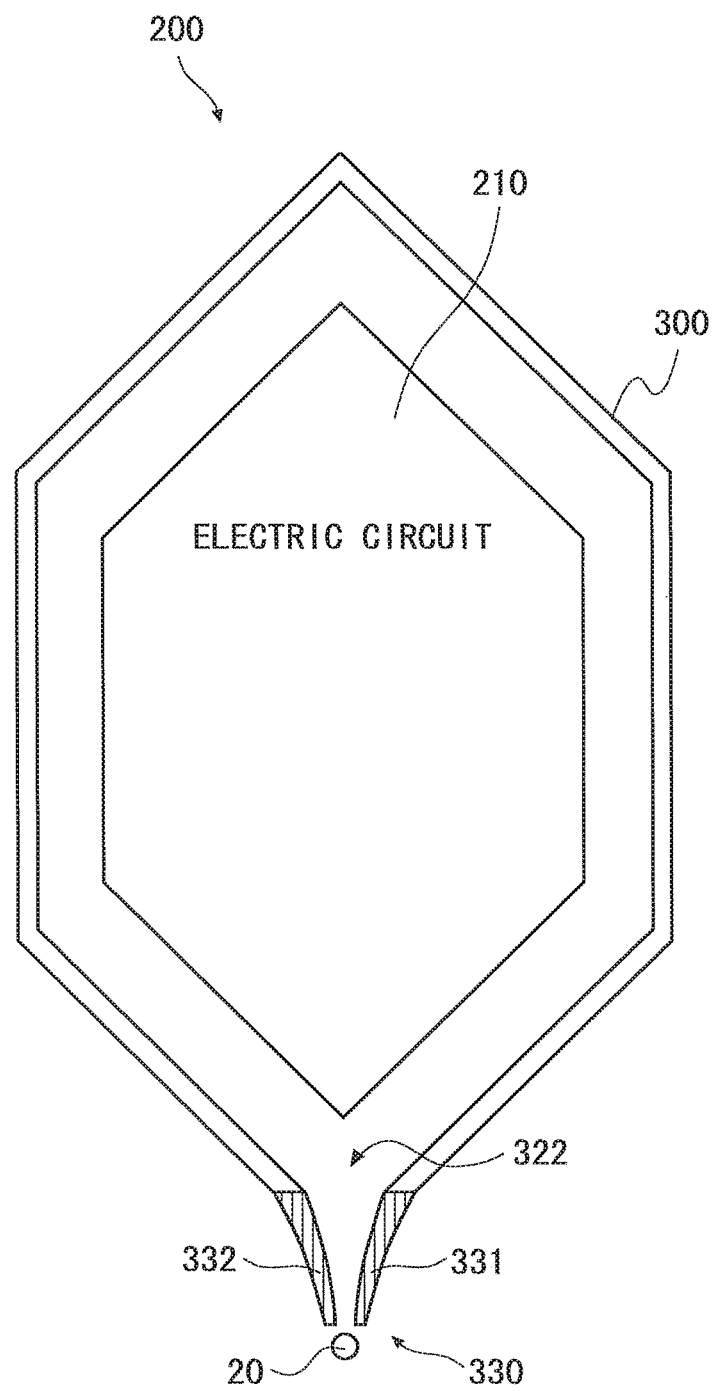
FIG. 12 is a diagram for explaining an operation and a function of the discharge valve.

The discharge valve 330 comprises the two parts 331, 332 in which the two parts 331, 332 push each other and therefore the discharge valve 330 closes, and when the internal pressure rises the two parts 331, 332 are separated and the discharge valve 330 opens as shown in FIG. 12. Then the aperture 322 at the lowermost part of the container box 300 opens, and the droplets 20 falls from the aperture 322 naturally.

In this way, the droplet 20 condensed inside of the container box 300 are discharged outside of the container box 300.

It might be considered that the internal pressure will not rise high enough to push the discharge valve 300 to open because, if there is a crack and if the container box 300 is not completely sealed, the inside air will flow out from the crack.

In view of this point, the container box 300 is basically designed to have a high airtightness, so if there is a crack it may be considered that the crack is extremely small.

Such a crack is not large enough for a big volume of the air to be discharged through it at once, and it is thus necessary for the internal pressure to become high enough to force out the air through such a crack. Therefore, it is expected that the discharge valve 300 will open when the internal pressure rises, even if a slight amount of air flows out from such a crack, when the temperature rises by about 20° C.

Next, the operation and the function of the suction valve 340 will be described.

The suction valve 340 opens and closes according to the internal pressure variation resulting from the temperature variation, like in the case of the discharge valve 330.

If the outside temperature becomes low, then the volume of the air inside of the container box 300 contracts.

The internal pressure of the container box 300 becomes low as the air volume decrease.

Here, dew condensation is likely to occur in the container box 300 because of a decrease in the internal pressure of the container box 300 in addition to the temperature decrease thereof. Therefore, it is preferable to suck the outside air into the container box 300 to avoid that the internal pressure becoming too low, if the internal pressure thereof greatly decreases. Then the suction valve 340 opens when a difference between the internal pressure and the external pressure becomes larger than a predetermined value.

Figure 13:
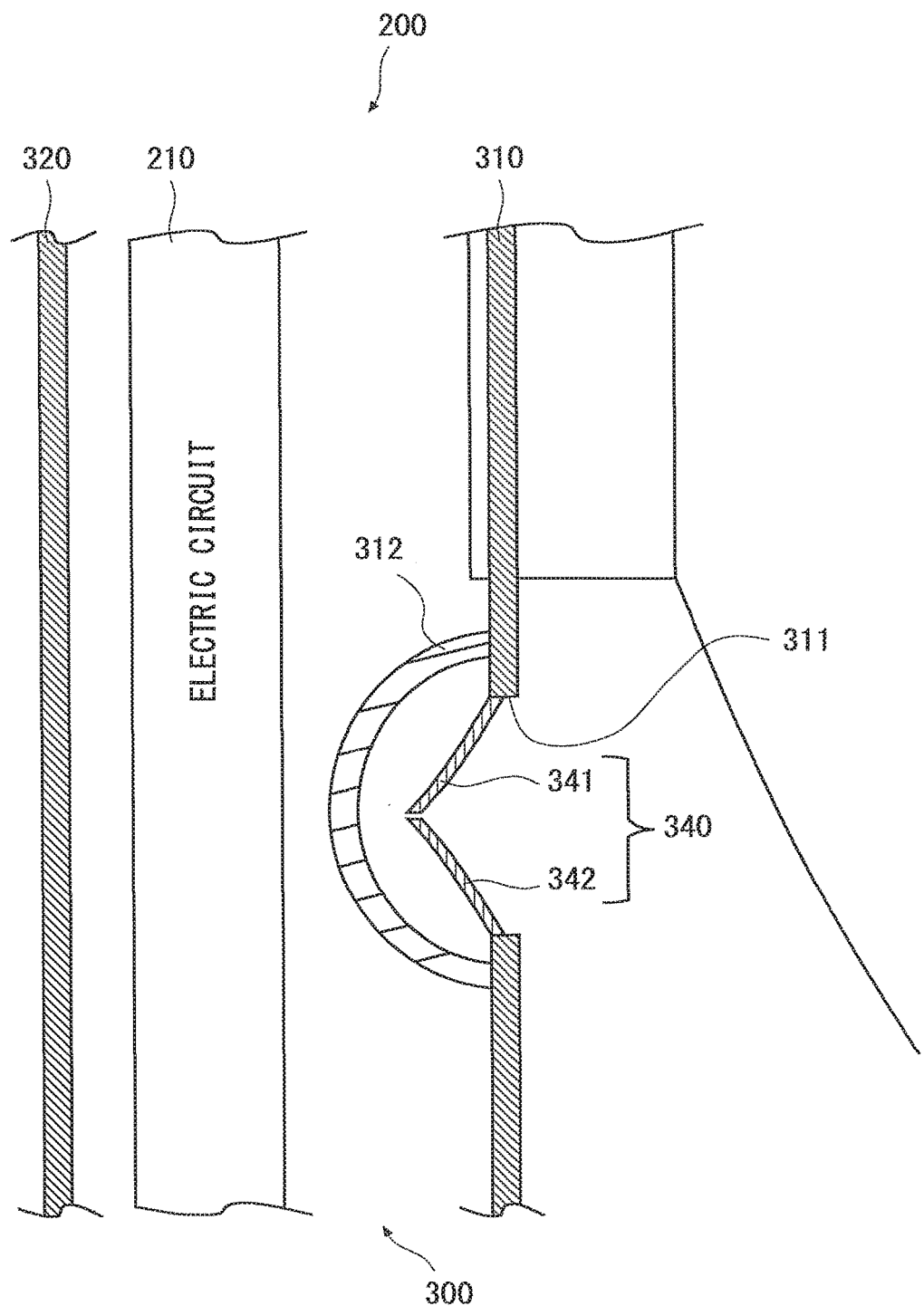
FIG. 13 is a diagram showing an attitude in which a suction valve opens and sucks outside air.

FIG. 13 shows an attitude in which a suction valve 340 opens and sucks outside air.

The suction valve 340 opens when the difference between the internal pressure and the external pressure becomes large as a result of the temperature decrease. At this time, a suctioned air passes through the filter 312. Accordingly, dust, a salt content, and moisture are filtered out from the suctioned air.

As described above, it should be understood that the antenna device 100 according to the first exemplary embodiment keeps the inside of the container box 300 at a low humidity with no condensation water therein.

Further, the discharge valve 330 and the suction valve 340 open and close without electric power and an actuator, etc. Therefore, as electric power is unnecessary for operations of the discharge valve 330 and the suction valve 340 and the operation systems are not complicated mechanisms, failure is not a concern.

Second Exemplary Embodiment

The Second exemplary embodiment of the present invention will be described.

The contrivance for the suction valve 340 is mainly described as the Second exemplary embodiment.

In the first exemplary embodiment, the suction valve 340 opens according to the difference between the internal pressure of the container box 300 and the external pressure thereof.

Here, the situation is one in which, for example, rain is expected. In such case, the outside air contains a lot of moisture therefore it is better not to suck the outside air even if the temperature becomes low.

Figure 14:
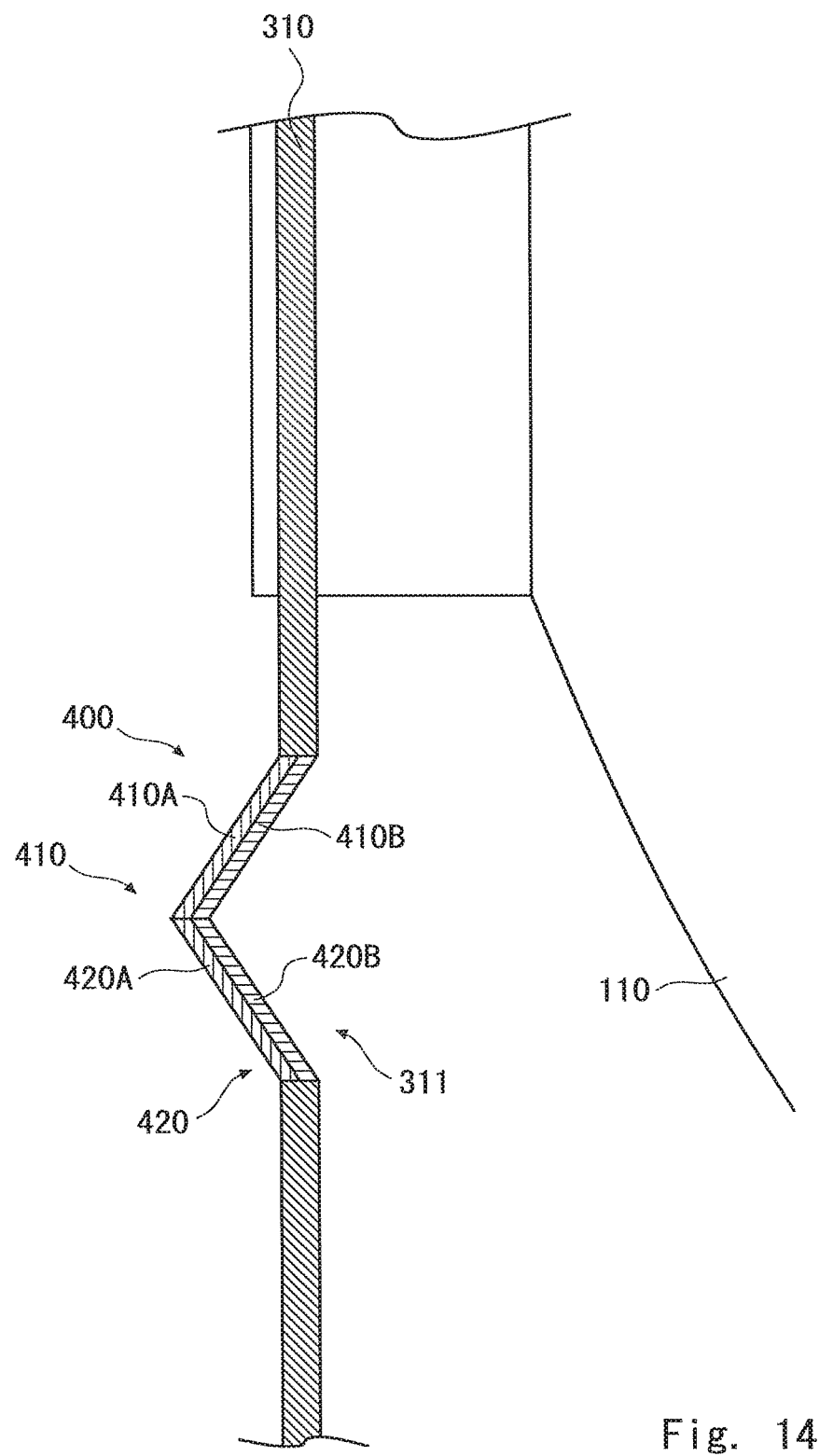
FIG. 14 is a diagram showing one example of the suction valve that needs a humidity difference between an outside air and an inside air of the container box in addition to a pressure difference between the outside air and the inside air of the container box when the suction valve 400 opens and closes.

It is preferable that a suction valve that suck only when an external humidity is lower than an internal humidity, comparing the internal humidity and the external humidity. FIG. 14 is a diagram showing a suction valve 400 that needs a humidity difference between an outside air and an inside air of the container box in addition to a pressure difference between the outside air and the inside air of the container box to open and close.

The suction valve 400 comprises two parts 410, 420. Each of the two parts 410, 420 have a two layer structure in which two thin materials are stuck on each other. The two layer structure is configured with materials, having elasticity to a certain extent and expanding/contracting depending on a humidity, that stick to each other. An inner layer of the suction valve part 410 is referred as 410A, and an outer layer of the suction valve part 410 is referred as 410B. An inner layer of the suction valve part 420 is referred as 420A, and an outer layer of the suction valve part 420 is referred as 420B.

Here, a material having a property by which it contracts when moistened (in other words, it expands when dried) is prepared. The suction valve parts 410, 420 each having two layers are configured with the thin materials stuck on each other in which the thin materials are made of such material.

Figure 16:
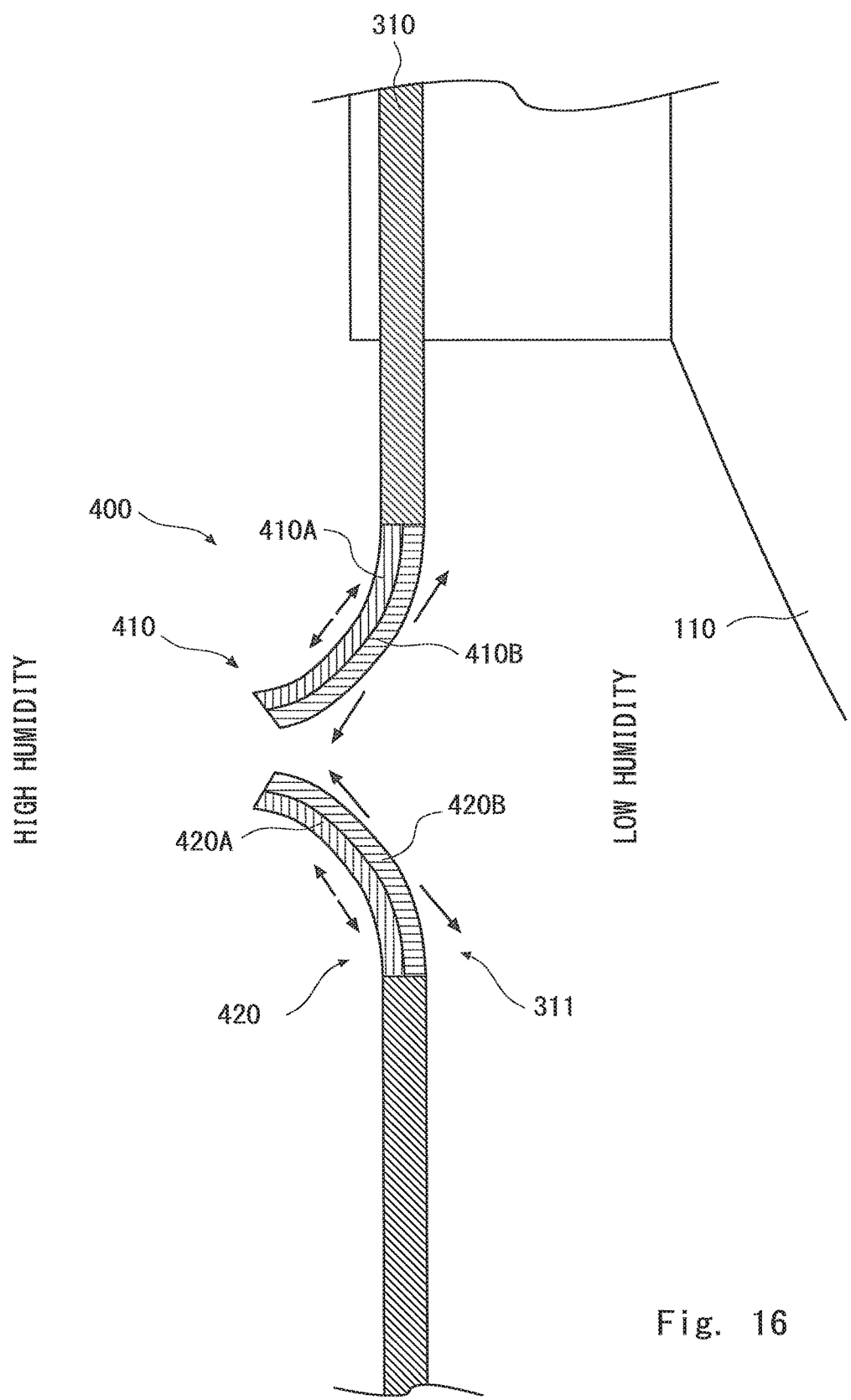
FIG. 16 is a diagram showing an attitude in which the suction valve opens and closes depending on a humidity difference.
Figure 17:
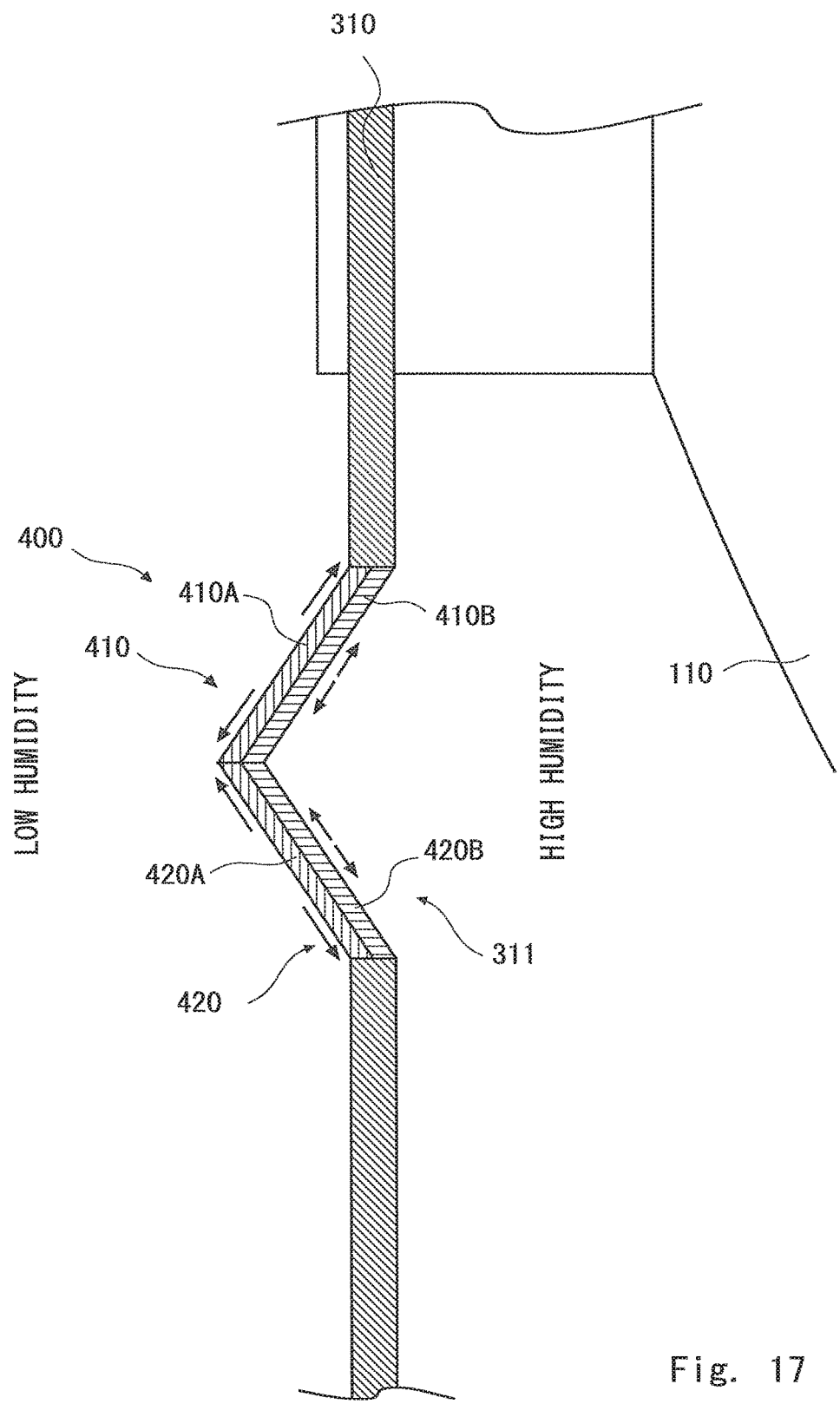
FIG. 17 is a diagram showing an attitude in which the suction valve opens and closes depending on a humidity difference.

The state in which the suction valve 400 opens and closes depending on a humidity difference will now be described with reference to FIGS. 15 to 17.

Figure 15:
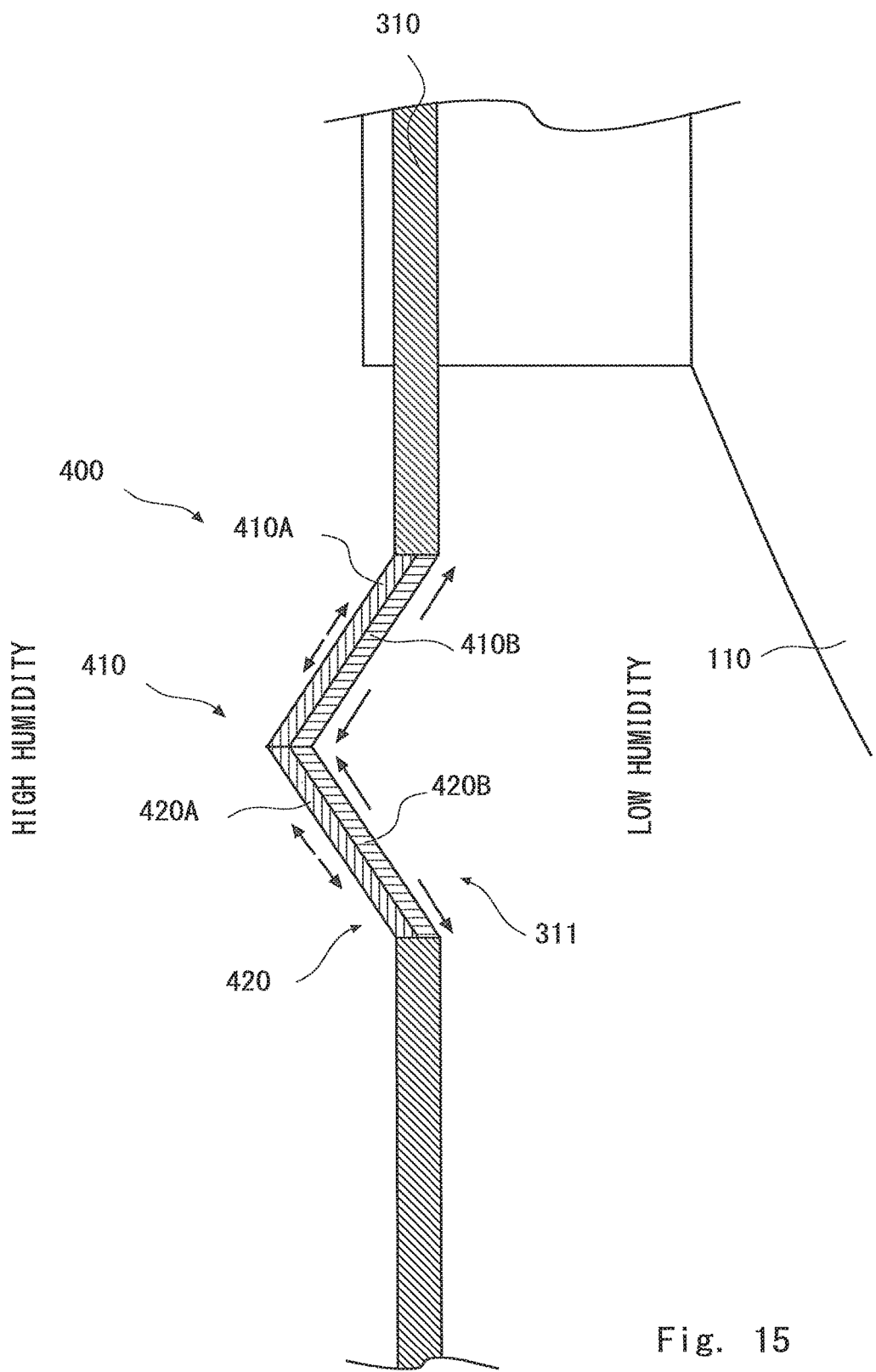
FIG. 15 is a diagram showing an attitude in which the suction valve opens and closes depending on a humidity difference.

In FIG. 15, it is assumed that a humidity inside of the container box 300 is high and a humidity outside of the container box 300 is low. In this case, it is preferable that the suction valve open. The length that the inner layers 410A, 420A expand is small because the inner layers 410A, 420A are exposed to the inside air containing a lot of moisture. On the other hand, the length that the outer layers 410B, 420B expand is large because the outer layers 410B, 420B are exposed to the outside air containing a small amount of moisture. Then the suction valve 400 is likely to open because the suction valve 400 is pushed from the inside thereof (See FIG. 16). For example, if the internal pressure of the container box 300 is low in accordance with the temperature decrease, this pressure difference between the inside and the outside pressure of the container box 300 in cooperation with the above humidity difference acts on the suction valve 400 to open it. (It is preferable that the suction valve 400 be adjusted to open not only by the above humidity difference but also by the above pressure difference; it should not to be opened only by the pressure difference.) Therefore, it is possible that the suction valve 400 may suck air with low humidity (dried air) into the container box 300.

In FIG. 7, it is assumed that the humidity inside of the container box 300 is low and the humidity outside the container box 300 is high. In this case, it is not preferable that the suction valve 400 open. The length that the inner layers 410A, 420A expand is large because the inner layers 410A, 420A are exposed to the inside air containing a small amount of moisture. On the other hand, the length that the outer layers 410B, 420B expand is small because the outer layers 410B, 420B are exposed to the outside air containing a lot of moisture. Then the suction valve 400 is hard to open. For example, if the internal pressure of the container box 300 becomes low in accordance with the temperature decrease, the above humidity difference counteracts the effect of the above pressure difference between the internal and external pressure of the container box 300 and the suction valve 400 remains closed. Therefore, the suction valve 400 does not suck air with high humidity into the container box 300.

In this way, the suction valve 400 according to the second exemplary embodiment sucks outside air only when the outside air has low humidity (dry). Therefore, the inside of the container box 300 is usually kept at low humidity. This suction valve 400 opens and closes depending on the humidity difference and it does not need electric power and an actuator, etc. separately. Therefore, electric power is unnecessary for operation of the suction valve 400 and the operation system is not a complicated mechanism, and thus failure is not a concern.

Third Exemplary Embodiment

The third exemplary embodiment of the present invention will now be described.

In the second exemplary embodiment, the suction valve 400 that automatically opens and closes depending only on the humidity difference as a result of the property of the material of the suction valve 400 is exemplified. However, the suction valve may be controlled to open and to close by using electric power and an actuator, etc. separately.

An example of such suction valve is described as the third exemplary embodiment.

Figure 18:
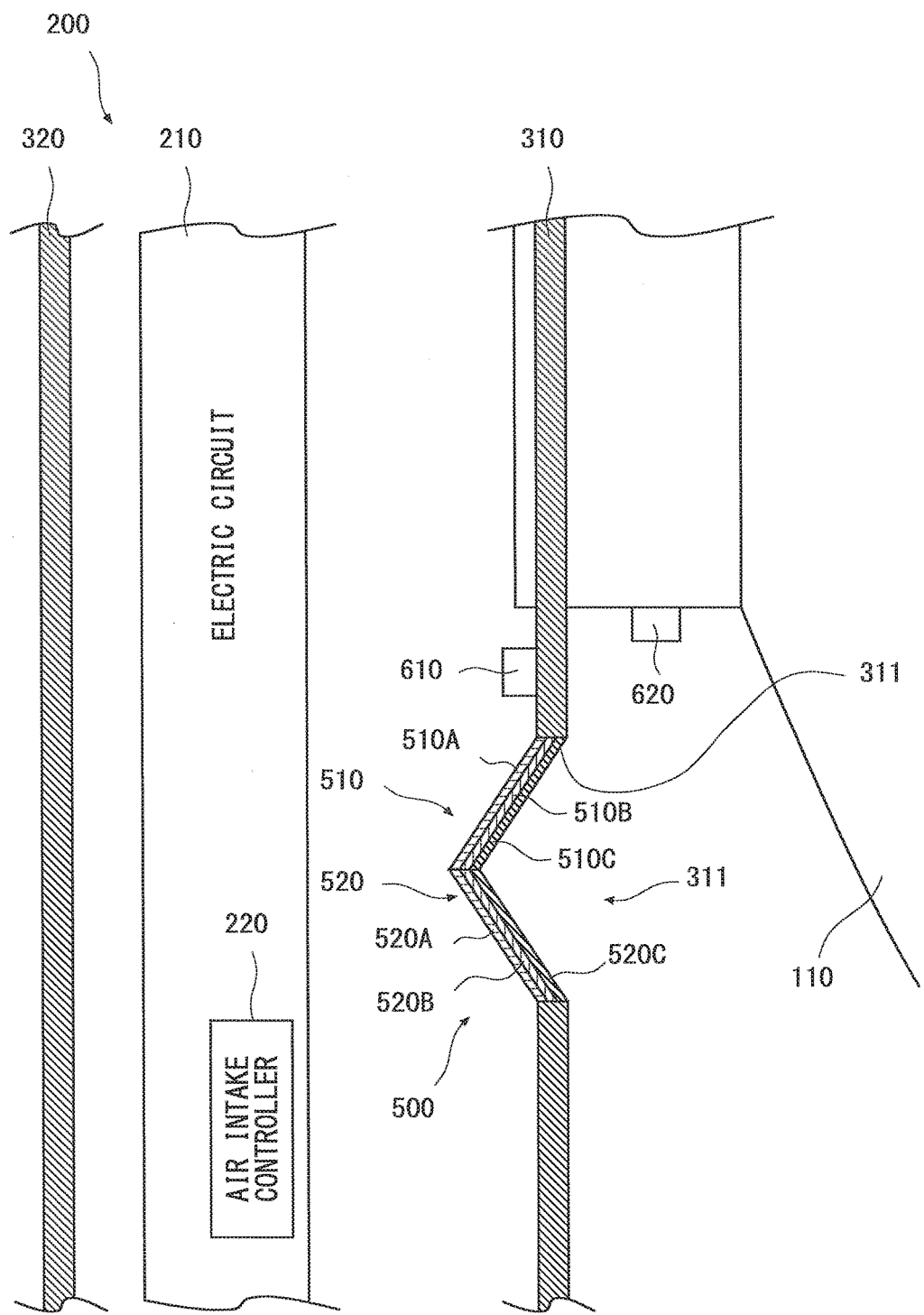
FIG. 18 is a diagram for explaining a third exemplary embodiment.

FIG. 18 is a diagram for explaining the third exemplary embodiment.

In FIG. 18, a suction valve 500 comprises a piezoelectric bimorph. Here, the piezoelectric bimorph has a three layer structure in which piezoelectric ceramics are respectively attached to a front side surface and a back side surface of a metal thin plate positioned at the center of the three layer structure.

If a differential voltage is applied to the piezoelectric ceramics at the front side surface and the back side surface of the metal thin plate, the direction of contracting and expanding of the piezoelectric ceramics will be opposite to each other and then the piezoelectric bimorph will bend ether the front side or the back side thereof.

(It should be noted that the illustration of electrical wiring is omitted.)

In FIG. 18, the suction valve 500 comprises a part 510 and a part 520 that come in and out of contact with each other. In the part 510, piezoelectric ceramics 510A, 510B are attached to a front side surface and a back side surface of a metal thin plate 510C positioned at the center of the three layer structure, and the piezoelectric ceramic of an inner layer is referred as 510A and the piezoelectric ceramic of an outer layer is referred as 510B. Similarly, in the part 520, the piezoelectric ceramics 520A, 520B are attached to a front side surface and a back side surface of a metal thin plate 520C positioned at the center of the three layer structure, and the piezoelectric ceramic of an inner layer is referred as 520A and the piezoelectric ceramic of an outer layer is referred as 520B.

Further, in the third exemplary embodiment, an inside humidity and an outside humidity of the container box are respectively detected by using two humidity sensors 610, 620. The inside humidity sensor 610 is positioned on the inside of the container box 300. The outside humidity sensor 620 is positioned on the outside of the container box 300.

The voltages applied to the piezoelectric ceramics 510A, 510B, 520A, 520B are controlled so that the suction valve 500 opens only when the outside humidity is higher than the inside humidity upon comparing the inside humidity detected by the inside humidity sensor 610 with the outside humidity detected by the outside humidity sensor 620. In this way, it is possible that the suction valve may suck the outside air into the container box 300 only when the outside thereof has low humidity.

On the other hand, it is possible to completely close the suction valve 500 when the outside of the container box 300 has high humidity to avoid the outside air having high humidity flowing into the container box 300. In this way, it is possible to keep the inside of the container box 300 at a low humidity.

It should be noted that in controlling the opening and closing of the suction valve 500 according to the humidity difference between the inside and outside of the container box 300, an suction controller 220 may be arranged in the electric circuit 210 and the inside humidity may be compared with the outside humidity and the applied voltage may be adjusted by the suction controller 220.

Fourth Exemplary Embodiment

In the first exemplary embodiment, it is described that the droplets 20 naturally fall from the aperture 322 when the discharge valve 330 (the two parts 331, 332) is pushed to open by an increase of the internal pressure.

As a further preferable example, it is preferable that the droplets be pushed out through the aperture by the pressure of the air flowing through the aperture from the inside to the outside thereof. It is preferable to make a diameter of the aperture that opens when the discharge valve is pushed to open extremely small so that, for example, it is the same as an expected diameter of the droplet or smaller than that.

Figure 19:
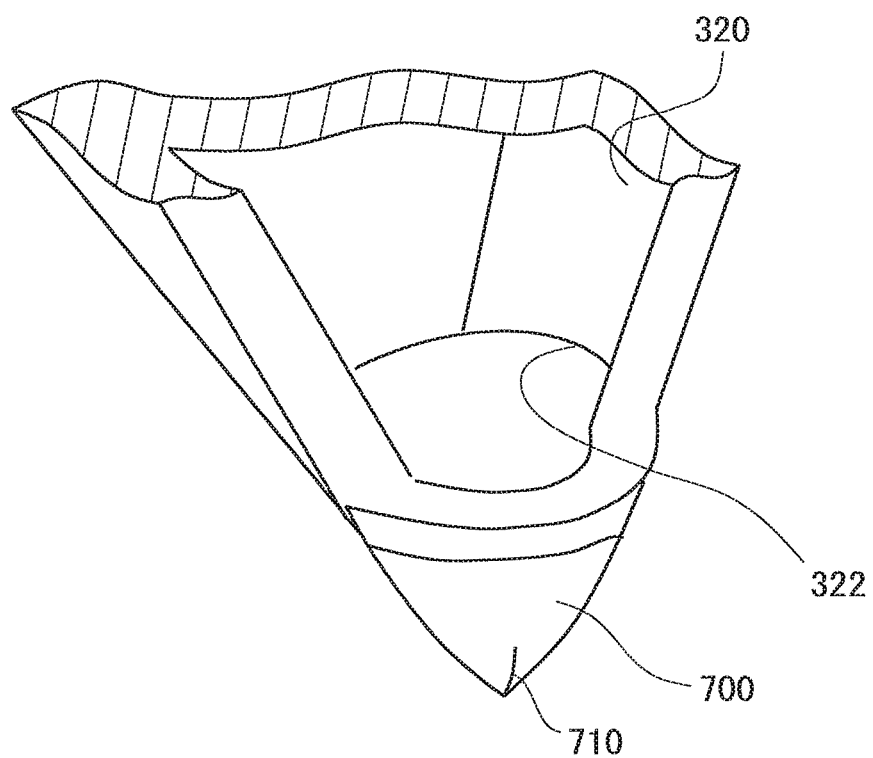
FIG. 19 is a diagram showing a discharge valve as a fourth exemplary embodiment.
Figure 20:
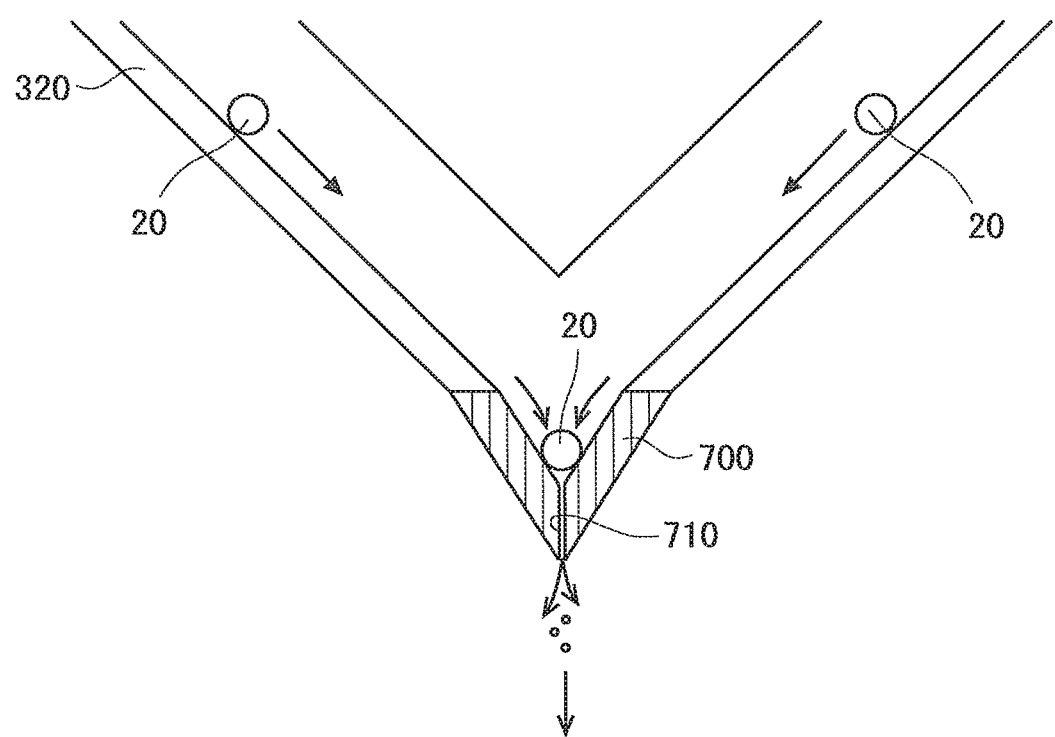
FIG. 20 is a diagram for explaining an attitude in which the discharge valve discharges a droplet therefrom in the fourth exemplary embodiment.

In FIG. 19, a discharge valve 700 comprises one part having a funnel shape and has a slight slit 710 at the vertex of the cone (in FIG. 19, corresponding to a lowermost part thereof). The slit 710 of the discharge valve 700 closes when the internal pressure of the container box 300 is not higher than the external pressure thereof by a predetermined value or greater. If dew condensation occurs in the container box 300, the condensed dew becomes droplets and the droplets will accumulate directly above the slit 710 of the discharge valve 700 that is the lowermost part thereof. Then, if the internal pressure of the container box 300 becomes higher than the external pressure thereof by a predetermined value or greater, the small slit 710 of the discharge valve 700 is pushed to open slightly (See FIG. 20). Then, the inside air swiftly flow out from the small slit 710 (See FIG. 20).

At this time, the droplets 20 accumulated directly above the slit 710 of the discharge valve 700 are discharged in such a way that the droplets 20 are pushed out by the flow of the air. In this way, it is possible to make sure that the condensed dew (the droplets) is discharged outside.

Fifth Exemplary Embodiment

In the second exemplary embodiment described above, the parts 410, 420 of the suction valve 400 are configured with the material having the property by which it contracts when moistened.

The case in which a suction valve is configured with the material having the property by which it expands when moistened is now exemplified.

Figure 21:
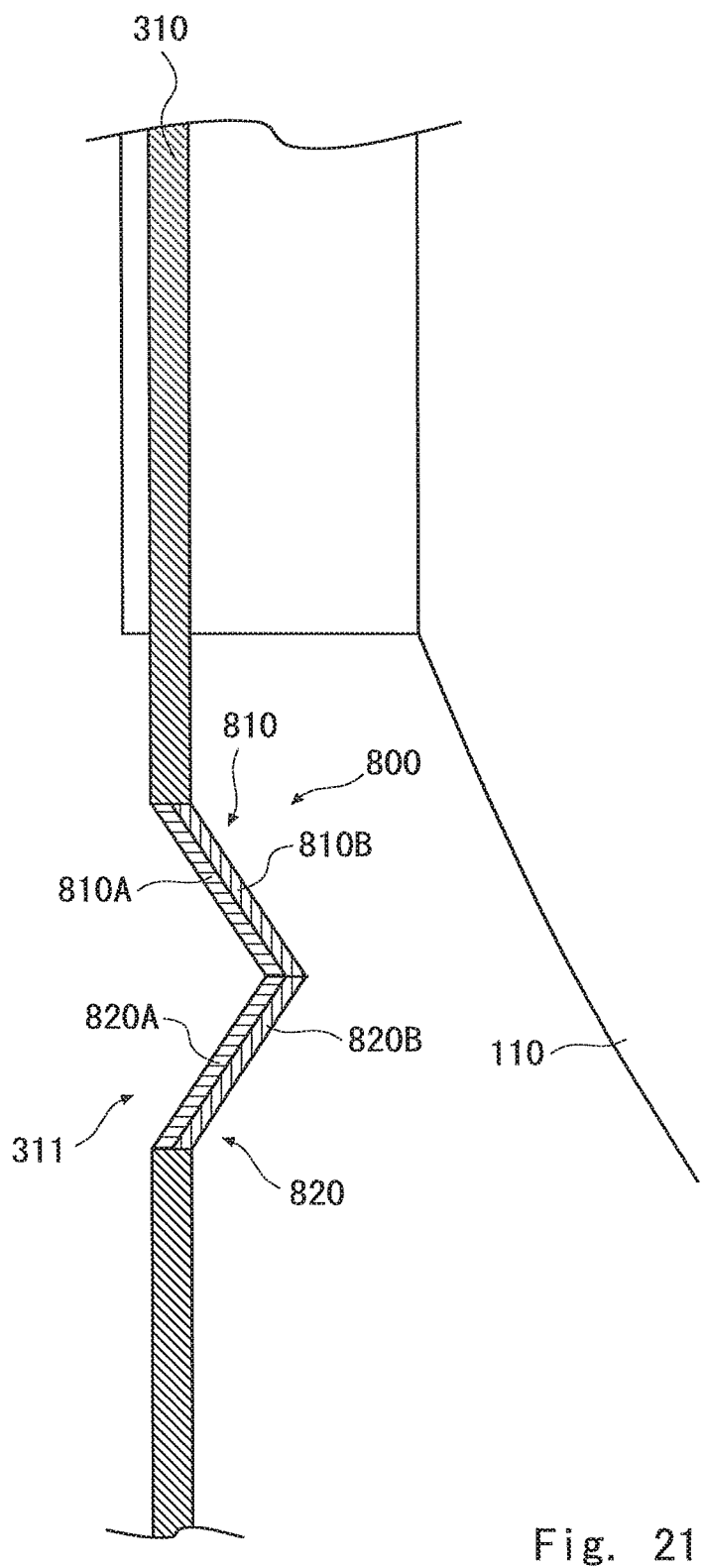
FIG. 21 is a diagram showing the configuration of a suction valve in a fifth exemplary embodiment.

FIG. 21 is a diagram showing the configuration of a suction valve 800 in a fifth exemplary embodiment.

Each of parts 810, 820 of the suction valve 800 have a two layer structure in which two thin materials are stuck on each other.

An inner layer of the suction valve part 810 is referred as 810A, and an outer layer of the suction valve part 810 is referred as 810B.

An inner layer of the suction valve part 820 is referred as 820A, and an outer layer of the suction valve part 820 is referred as 820B.

Here, the thin plate that configures each of the suction parts 810, 820 and has a property that it expands when moistened is exemplified. For example, hydrophilic resin has a property that it expands when it absorbs moisture. The parts 810, 820 of the suction valve 800 each having two layers are configured with the thin materials stuck to each other in which the thin materials consist of a hydrophilic resin having elasticity to a certain extent.

Here, it is different from the first and second exemplary embodiments, the vertex of the suction valve 800 that is circular conical shaped faces toward the outside of the container box 300. It will be understood why the vertex of the suction valve 800 having a conical shape faces toward the outside thereof by reading the following explanation of the examples of the operation of the suction valve 800.

The attitude of the suction valve 800 in which the suction valve 800 opens and closes depending on the humidity difference will be described with reference to FIGS. 22 to 24.

Figure 22:
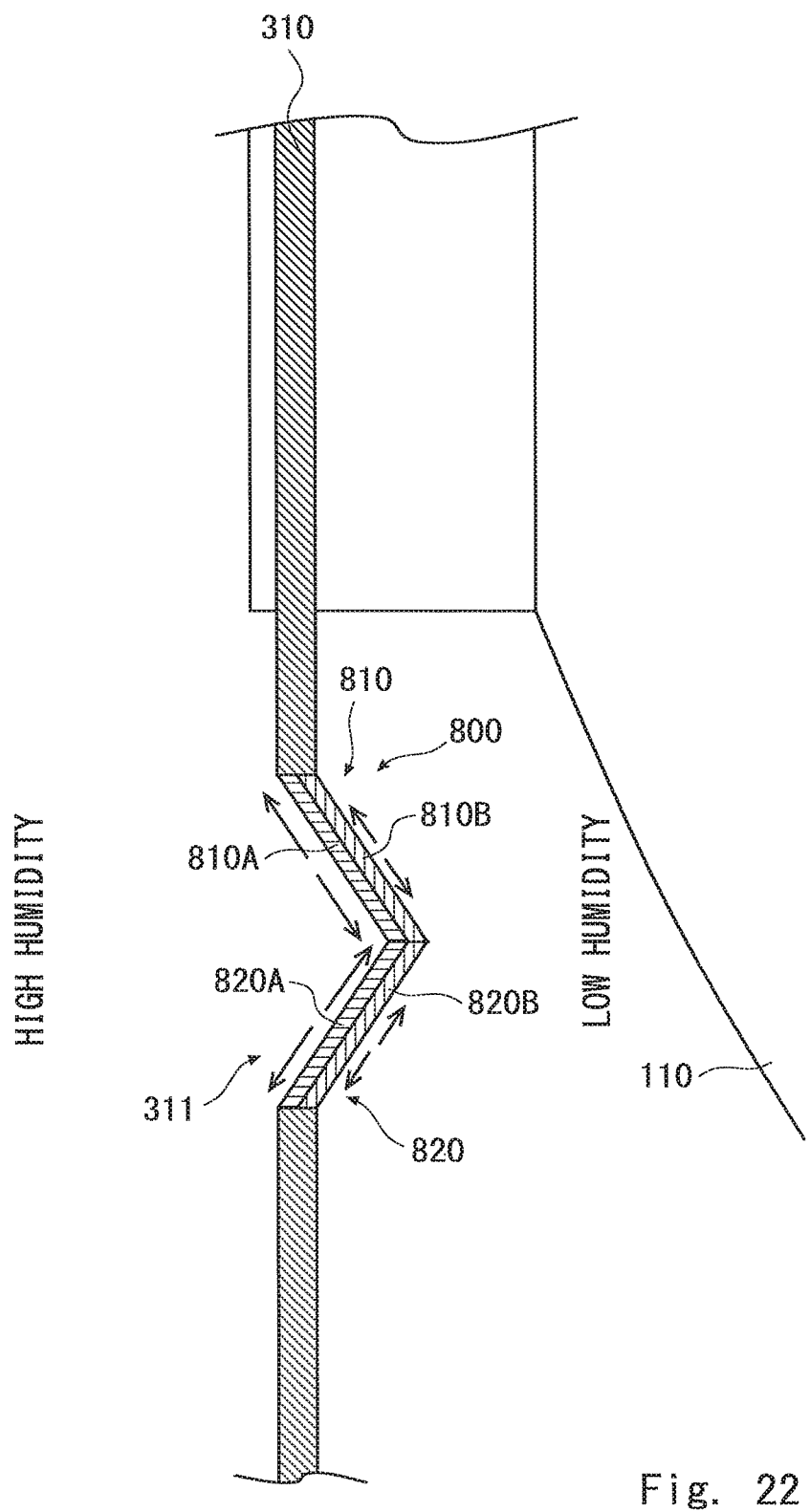
FIG. 22 is a diagram for explaining an operation of the suction valve in the fifth exemplary embodiment.
Figure 23:
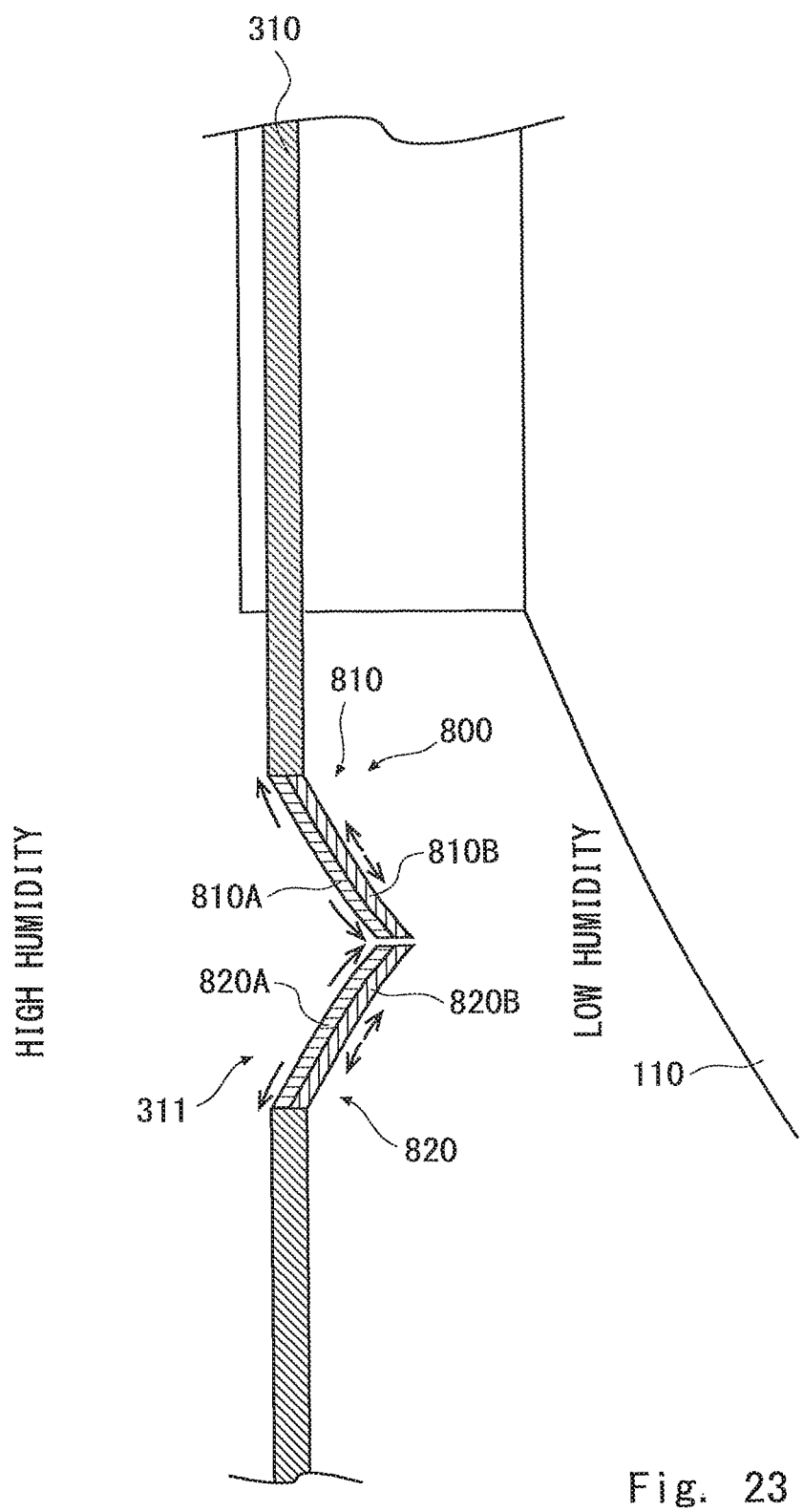
FIG. 23 is a diagram for explaining an operation of the suction valve in the fifth exemplary embodiment.

In FIG. 22, it is assumed that the humidity inside of the container box 300 is high and the humidity outside of the container box 300 is low. In this case, it is preferable that the suction valve 800 preferably open. The length that the inner layers 810A, 820A expand is large because the inner layers 810A, 820A are exposed to the inside air containing a lot of moisture. On the other hand, the length that the outer layers 810B, 820B expand is small because the outer layers 810B, 820B are exposed to the outside air containing a small amount of moisture. Then the suction valve 800 is likely to open because the suction valve 800 is pushed from the inside thereof (See FIG. 23). Therefore, it is possible that the suction valve 800 may suck air having low humidity (dried air) into the container box 300.

It should be noted that the suction valve 800 has a structure in which the suction valve 800 is likely to open when the internal pressure of the container box 300 is higher than the external pressure thereof because the vertex of the suction valve 800 faces toward the outside of the container box. There is a need to prevent the suction valve 800 from being easily open only by the increase of the inner pressure because the discharge valve (330) discharges the droplet due to the increase of the inner pressure. The material having elasticity to a certain extent is selected as the material for the thin plate that configures the suction valve parts 810, 820. Then the suction valve parts 810, 820 are attached to the discharge aperture so that the tips of the suction valve parts 810, 820 are pushed together with a sufficient energizing force to close the suction valve 800.

In this way, the suction valve 800 is harder to open than the discharge valve (330) depending on the increase of the internal pressure and it is not until the humidity inside of container box 300 is high that the suction valve 800 opens.

Figure 24:
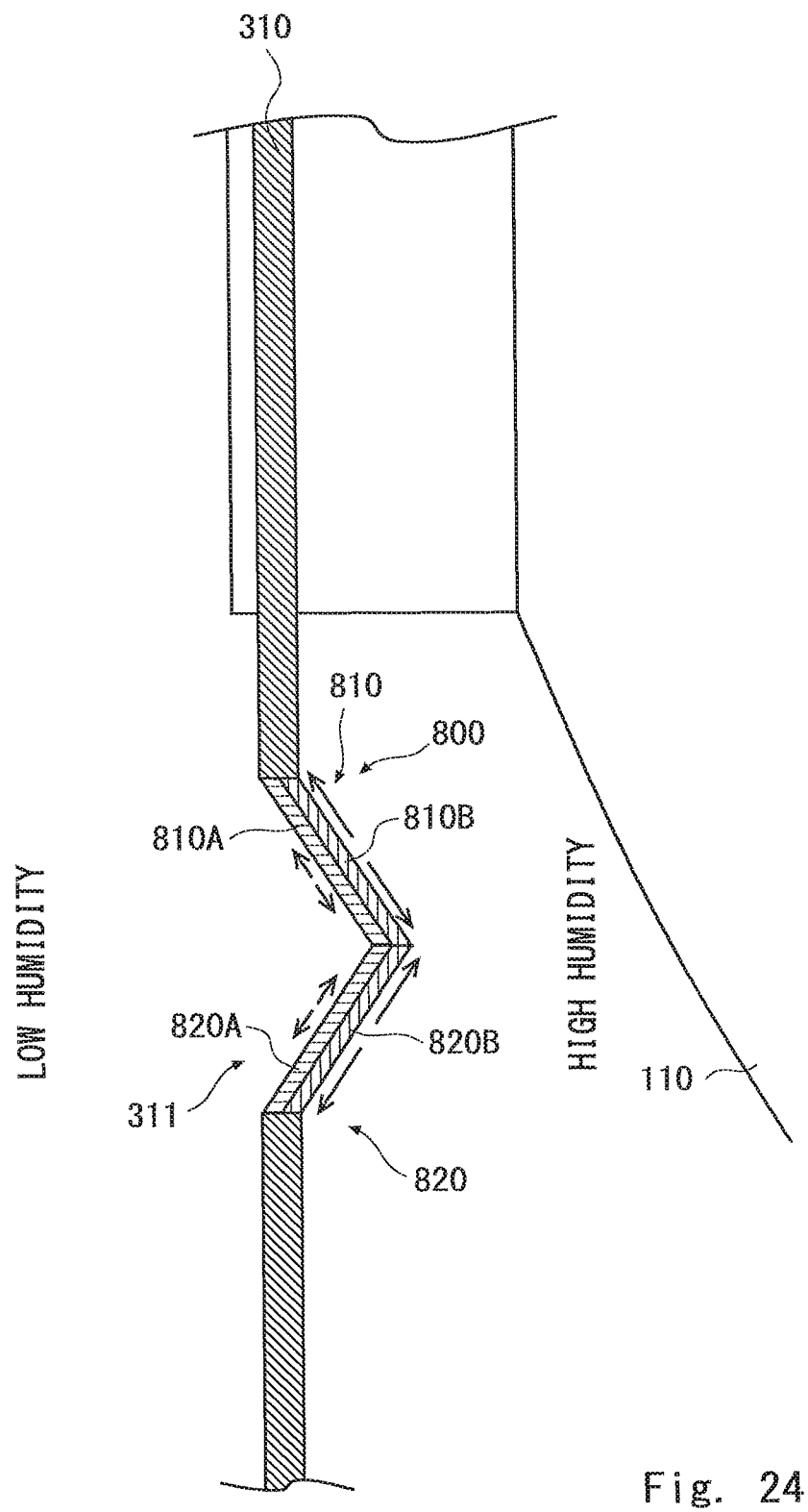
FIG. 24 is a diagram for explaining an operation of the suction valve in the fifth exemplary embodiment.

Next, in FIG. 24, it is assumed that the humidity inside of the container box 300 is low and the humidity outside the container box 300 is high. In this case, it is not preferable that the suction valve 800 open. The length that the inner layers 810A, 820A expand is small because the inner layers 810A, 820A are exposed to the inside air containing a small amount of moisture. On the other hand, the length that the outer layers 810B, 820B expand is large because the outer layers 810B, 820B are exposed to the outside air containing a lot of moisture. Then the suction valve 800 is hard to open. Therefore, the suction valve 800 does not suck air having high humidity into the container box 300.

In this way, the suction valve 800 according to the fifth exemplary embodiment sucks outside air only when the outside air has low humidity (dry). Therefore, the inside of the container box 300 is usually kept at a low humidity.

Sixth Exemplary Embodiment

In the exemplary embodiment described above, although mainly the antenna device 100 is explained as an example, the present invention is widely applicable to any electric device that is placed outside.

Figure 25:
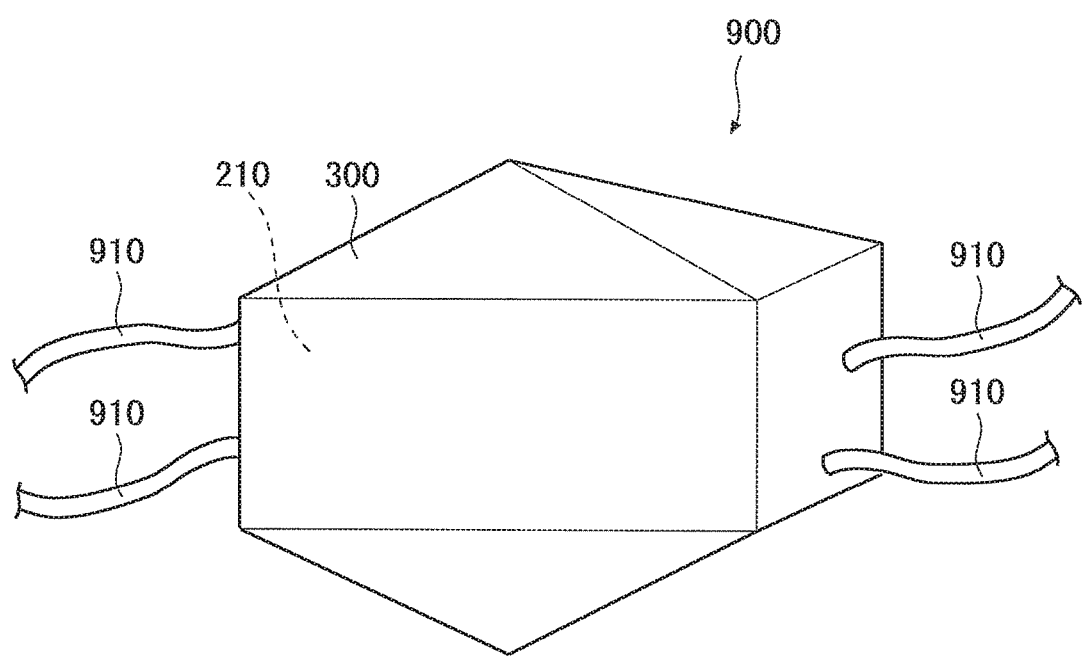
FIG. 25 is a diagram for explaining a sixth exemplary embodiment.

For example, FIG. 25 shows one example of a data transferring device as an example other than the antenna device. The electric circuit 210 is contained inside the container box 300. A plurality of wirings 910 are connected to the container box 300. Here, the electric circuit 210 includes a router and a signal amplifier, and it sends a signal coming through one of the wirings 910 into another wiring 910. When such date transferring device is placed outside, the container box 300 has all the structures described in the above exemplary embodiment, so that the electric circuit 210 is protected from dew condensation and moisture.

As a domestic electricity consumption meter, a relay device placed on a telegraph pole, and an electric unit of a transportation system etc. are placed outside as electric devices that placed outside, it is obvious that the present invention may efficiently contributes to the efficiency of the container box thereof.

It should be noted that the present invention is not limited to the above exemplary embodiments and may be changed as appropriate without departing from the spirit of the present invention.

As a matter of course, not only in the first exemplary embodiment but also in the second, third, fifth exemplary embodiments, the suction valve may be covered by the filter. Further, there are, of course, many various ideas introduced on how to position the filter.

In the exemplary embodiment described above, the shape of the container box is assumed to be a bipyramid that is seen as being a hexagon when viewed from the back surface side of the container box, but the shape of the container box is not, of course, limited to the above shape.

Figure 26:
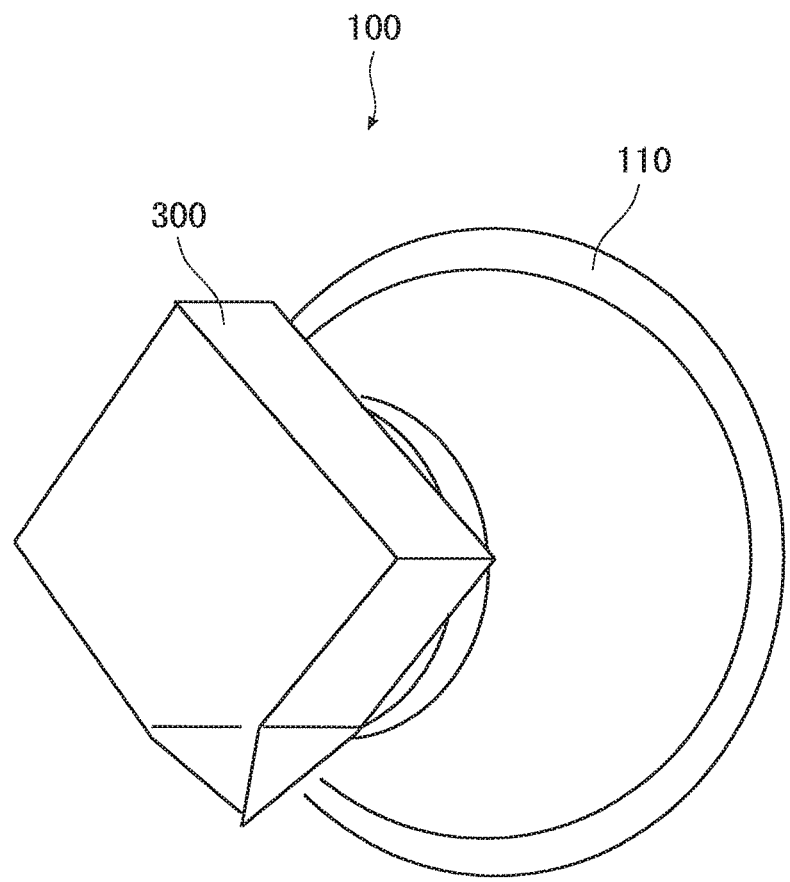
FIG. 26 is a diagram showing a variation of a shape of the container box.

For example, as shown in FIG. 26, the shape of the container box as viewed from the back surface side thereof may be rectangular. Specifically, by only making the bottom part of the container box a conic form and making the top part of the container box incline, the top part of the container box may have a gable form (In other words, the top part of the container box may have a shape where two inclined surfaces are joined to each other at the uppermost part of the container box, at the ridge of the gable roof.)

As described above, the discharge valve and the suction valve are configured to be like a beak of a bird. In addition, for example, the discharge valve and the suction valve may be configured with 3 or 4 thin plates.

The present invention has been described above with reference to exemplary embodiments. However, the present invention is not limited to the above exemplary embodiments. The configuration and details of the present invention can be modified in various manners which can be understood by those skilled in the art within the scope of the invention.

This application is based upon and claims the benefit of priority from Japanese Patent Application No. 2013-188543, filed on Sep. 11, 2013, the disclosure of which is incorporated herein in its entirety by reference.

REFERENCE SIGNS LIST

10 POLE
20 DROPLET
22 PROJECTION
100 ANTENNA DEVICE
110 ANTENNA UNIT
120 MOUNTING MEANS
200 TRANSMITTING RECEIVING UNIT
210 ELECTRIC CIRCUIT
211 CHIP
212 SUBSTRATE
220 SUCTION CONTROLLER
300 CONTAINER BOX
310 FRONT SIDE PART
311 APERTURE
312 FILTER
320 BACK SIDE PART
321 MINUTE CONCAVE-CONVEX PART
322 APERTURE
330 DISCHARGE VALVE
331, 332 DISCHARGE VALVE PART
340 SUCTION VALVE
341, 342 SUCTION VALVE PART
400 SUCTION VALVE
410, 420 SUCTION VALVE PART
410A INNER LAYER
410B OUTER LAYER
500 SUCTION VALVE
510 SUCTION VALVE PART
510A, 510B PIEZOELECTRIC CERAMIC
510C METAL THIN PLATE
520 SUCTION VALVE PART
520A, 520B PIEZOELECTRIC CERAMIC
520C METAL THIN PLATE
610 INSIDE HUMIDITY SENSOR
620 OUTSIDE HUMIDITY SENSOR

The invention claimed is:

1. An antenna device comprising:
an antenna unit configured to transmit and receive a radio wave; and
a transmitting receiving unit configured to control transmitting and receiving of the radio wave using the antenna unit, wherein the transmitting receiving unit comprises:
an electric circuit; and
a container box containing and sealing the electric circuit to protect the electric circuit from an external environment, the container box including:
a discharge aperture formed at a lowermost part of the container box;
a discharge check valve configured to open and close the discharge aperture, the discharge valve being configured to:
open the discharge aperture to discharge liquid inside of the container box when an internal pressure inside the container box becomes higher than an external pressure outside the container box by at least a first predetermined pressure value and
close the discharge aperture to keep airtightness of the container box when the internal pressure is not higher than the external pressure by at least the first predetermined pressure value;
a suction aperture formed at either a side surface or a lower surface of the container box; and
a suction valve configured to open and close the suction aperture, wherein the suction valve is configured to:
open the suction aperture to draw air inside when the internal pressure is less than the external pressure by at least a second predetermined pressure value, and
close the suction aperture when the internal pressure is not less than the external pressure by at least the second predetermined pressure value,
wherein the suction valve includes at least two elastic parts, and respective bottoms of the at least two elastics parts are attached to a periphery of the suction aperture such that respective tips of the at least two elastic parts contact, and apply pressure to, each other when the suction valve closed to keep airtightness of the container box.

2. The antenna device according to claim 1, wherein the discharge check valve includes at least two elastic parts, and respective bottoms of the at least two elastic parts of the discharge check valve are attached to a periphery of the discharge aperture such that the respective tips of the at least two elastic parts contact, and apply pressure to each other when the discharge check valve is closed to keep airtightness of the container box.

3. The antenna device according to claim 1, wherein an inner wall of the container box includes a shape on which dew condenses more easily than on the electric circuit.

4. The antenna device according to claim 1, wherein at least a portion of an inner wall of the container box is water-repellent.

5. The antenna device according to claim 1, wherein an inner wall of the container box is inclined downward from an uppermost part of the container box so that the inner wall of the container box has one of a conic form and a gable form such that droplets adhere to the inner wall and flow downward along the inner wall.

6. The antenna device according to claim 1, wherein the suction valve is further configured to:
open the suction aperture to draw in outside air if a humidity inside the container box is higher than a humidity of the outside air, and
close the suction aperture to keep airtightness of the container box if the humidity inside the container box is not higher than the humidity of the outside air.

7. The antenna device according to claim 1, wherein the suction valve includes an air filter for filtering the air drawn into the suction aperture.

8. The antenna device according to claim 1, wherein:
at least one of the elastic parts of the suction valve has a layered structure including at least one layer configured to expand when dried and contract when moistened; and the suction valve opens when the at least one layer expands when dried.

9. The antenna device according to claim 1, wherein:
at least one of the elastic parts of the suction valve has a layered structure including at least one layer configured to contract when dried and expand when moistened; and
the suction valve opens when the at least one layer contracts when dried.

10. The antenna device according to claim 1, further comprising a first humidity sensor configured to measure a humidity of the outside air and a second humidity sensor configured to measure a humidity inside the container box, wherein:
the suction valve opens and closes by electrical control of the electric circuit, and
the electric circuit is configured to open the suction valve when the humidity of the outside air measured by the first humidity sensor is lower than the humidity inside the container box measured by the second humidity sensor.

11. The antenna device according to claim 1, wherein the antenna has a parabolic shape and
the suction aperture is formed at a location below a mounting position of the antenna unit.

12. A container box configured to contain an electric circuit therein and sealed to protect the electric circuit from an external environment, the container box comprising:
a discharge aperture formed at a lowermost part of the container box;
a discharge check valve configured to open and close the discharge aperture, the discharge valve being configured to:
open the discharge aperture to discharge liquid inside of the container box when an internal pressure inside the container box becomes higher than an external pressure outside the container box by at least a first predetermined pressure value and
close the discharge aperture to keep airtightness of the container box when the internal pressure is not higher than the external pressure by at least the first predetermined pressure value;
a suction aperture formed at either a side surface or a lower surface of the container box; and
a suction valve configured to open and close the suction aperture, wherein the suction valve is configured to:
open the suction aperture to draw air inside when the internal pressure is less than the external pressure by at least a second predetermined pressure value, and
close the suction aperture when the internal pressure is not less than the external pressure by at least the second predetermined pressure value,
wherein the suction valve includes at least two elastic parts, and respective bottoms of the at least two elastics parts are attached to a periphery of the suction aperture such that respective tips of the at least two elastic parts contact, and apply pressure to, each other when the suction valve closed to keep airtightness of the container box.

13. The container box according to claim 12, wherein the discharge check valve includes at least two elastic parts, and respective bottoms of the at least two elastic parts of the discharge check valve are attached to a periphery of the discharge aperture such that the respective tips of the at least two elastic parts contact, and apply pressure to each other when the discharge check valve is closed to keep airtightness of the container box.

14. The container box according to claim 12, wherein an inner wall of the container box includes a shape on which dew condenses more easily than on the electric circuit.

15. The container box according to claim 12, wherein at least a portion of an inner wall of the container box is water-repellent.

16. The container box according to claim 12, wherein an inner wall of the container box is inclined downward from an uppermost part of the container box so that the inner wall of the container box has one of a conic form and a gable form such that droplets adhere to the inner wall and flow downward along the inner wall.

17. The container box according to claim 12, wherein the suction valve is further configured to:
open the suction aperture to draw in outside air if a humidity inside the container box is higher than a humidity of the outside air, and
close the suction aperture to keep airtightness of the container box if the humidity inside the container box is not higher than the humidity of the outside air.

18. The container box according to claim 12, wherein the suction valve includes a filter for filtering the air drawn into the suction aperture.

19. The container box according to claim 12, wherein:
at least one of the elastic parts of the suction valve has a layered structure including at least one layer configured to expand when dried and contract when moistened; and
the suction valve opens when the at least one layer expands when dried.

20. The container box according to claim 12, further comprising a first humidity sensor configured to measure a humidity outside the container box and a second humidity sensor configured to measure a humidity inside the container box, wherein:
the suction valve opens and closes by electrical control of the electric circuit, and
the electric circuit is configured to open the suction valve when the humidity outside the container box measured by the first humidity sensor is lower than the humidity inside the container box measured by the second humidity sensor.

* * * * *

UNITED STATES PATENT AND TRADEMARK OFFICE
CERTIFICATE OF CORRECTION

PATENT NO. : 9,685,985 B2  
APPLICATION NO. : 15/021007  
DATED : June 20, 2017  
INVENTOR(S) : Katsushi Yamamoto Page 1 of 1

It is certified that error appears in the above-identified patent and that said Letters Patent is hereby corrected as shown below:

On the Title Page

Item (57), Lines 9-10, "Only when the an internal pressure" should read -- Only when an internal pressure --.

Item (57), Line 12, "does the discharge valve (330) opens" should read -- does the discharge valve (330) open --.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*